United States Patent
Kennedy et al.

(10) Patent No.: US 11,874,124 B2
(45) Date of Patent: *Jan. 16, 2024

(54) DURATION-BASED CUSTOMIZED MEDIA PROGRAM

(71) Applicant: Spotify AB, Stockholm (SE)

(72) Inventors: Lawrence Kennedy, San Francisco, CA (US); Johan Oskarsson, Stockholm (SE)

(73) Assignee: Spotify AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/498,523

(22) Filed: Oct. 11, 2021

(65) Prior Publication Data

US 2022/0099452 A1 Mar. 31, 2022

Related U.S. Application Data

(63) Continuation of application No. 16/239,237, filed on Jan. 3, 2019, now Pat. No. 11,168,996, which is a
(Continued)

(51) Int. Cl.
*G01C 21/34* (2006.01)
*G01C 21/36* (2006.01)
(Continued)

(52) U.S. Cl.
CPC ..... *G01C 21/3484* (2013.01); *G01C 21/3492* (2013.01); *G01C 21/3685* (2013.01);
(Continued)

(58) Field of Classification Search
CPC ............ G01C 21/3484; G01C 21/3492; G01C 21/3685; G01C 21/3697; G06F 16/487;
(Continued)

(56) References Cited

U.S. PATENT DOCUMENTS 8,688,991 B1 4/2014 Sunil
9,164,996 B2 * 10/2015 Jellison, Jr. ........... G06F 16/635
(Continued)

FOREIGN PATENT DOCUMENTS

CN 106155945 11/2016
EP 2402872 1/2012
(Continued)

OTHER PUBLICATIONS

Chen Trista et al., "VRAPS: Visual Rhythm-based Audio Playback System," 2010, IEEE, ICME, 2 pages.
(Continued)

*Primary Examiner* — Tuan C To
(74) *Attorney, Agent, or Firm* — Merchant & Gould P.C.

(57) ABSTRACT

Systems, devices, apparatuses, components, methods, and techniques for building customized media programs for a specified duration are provided. An example media-playback device for generating customized media programs for a route to a specified duration includes a user preferences engine to determine a user's listening preferences, a duration engine to determine a duration of the route, and a duration-based media program engine for building a playlist of news and entertainment media content based on the duration of the route and the preferences of the user.

24 Claims, 23 Drawing Sheets

Related U.S. Application Data continuation of application No. 15/721,100, filed on Sep. 29, 2017, now Pat. No. 10,203,216.

(60) Provisional application No. 62/441,266, filed on Dec. 31, 2016.

(51) Int. Cl.
*G08G 1/0967* (2006.01)
*G06F 16/487* (2019.01)
*G06F 16/48* (2019.01)
*G06F 16/438* (2019.01)
*G08G 1/0962* (2006.01)
*G08G 1/0968* (2006.01)

(52) U.S. Cl.
CPC ..... *G01C 21/3697* (2013.01); *G06F 16/4387* (2019.01); *G06F 16/487* (2019.01); *G06F 16/489* (2019.01); *G08G 1/0962* (2013.01); *G08G 1/09675* (2013.01); *G08G 1/096716* (2013.01); *G08G 1/096775* (2013.01); *G08G 1/096827* (2013.01); *G08G 1/096844* (2013.01)

(58) Field of Classification Search
CPC . G06F 16/489; G06F 16/4387; G08G 1/0962; G08G 1/096716; G08G 1/09675; G08G 1/096775; G08G 1/096827
USPC ........................................................ 701/465
See application file for complete search history.

(56) References Cited

U.S. PATENT DOCUMENTS

| | | | |
|---|---|---|---|
| 9,229,938 B1* | 1/2016 | Jaini ................ | H04N 21/26258 |
| 9,288,254 B2 | 3/2016 | Sharkey | |
| 9,390,757 B2* | 7/2016 | Shahraray .............. | H04N 5/783 |
| 9,423,263 B2* | 8/2016 | Tuukkanen ........... | G06F 3/0482 |
| 10,203,216 B2 | 2/2019 | Kennedy | |
| 11,168,996 B2* | 11/2021 | Kennedy .......... | G08G 1/096775 |
| 2010/0010648 A1* | 1/2010 | Bull ........................ | G06F 16/44 |
| | | | 707/E17.016 |
| 2011/0040707 A1* | 2/2011 | Theisen ............... | G11B 27/105 |
| | | | 706/46 |
| 2011/0087842 A1 | 4/2011 | Lu | |
| 2012/0002515 A1 | 1/2012 | Muench | |
| 2012/0109345 A1 | 5/2012 | Gilliland | |
| 2013/0005465 A1 | 1/2013 | Murphy | |
| 2013/0253833 A1 | 9/2013 | Tuukkanen | |
| 2014/0181656 A1 | 6/2014 | Kumar | |
| 2014/0281971 A1 | 9/2014 | Isbell, III | |
| 2014/0307878 A1 | 10/2014 | Osborne | |
| 2015/0032366 A1 | 1/2015 | Man | |
| 2015/0032769 A1* | 1/2015 | Rose ..................... | G06F 16/487 |
| | | | 707/769 |
| 2015/0053066 A1 | 2/2015 | Hampiholi | |
| 2015/0178280 A1 | 6/2015 | DiMaria | |
| 2015/0205971 A1 | 7/2015 | Sanio | |
| 2015/0213018 A1 | 7/2015 | Sanio | |
| 2016/0018969 A1* | 1/2016 | Sundarraman ........ | H04W 4/023 |
| | | | 715/747 |
| 2016/0044129 A1 | 2/2016 | Bergmann | |
| 2016/0094302 A1 | 3/2016 | Berner | |
| 2016/0150020 A1 | 5/2016 | Farmer | |
| 2016/0294897 A1* | 10/2016 | Bryant .................... | H04L 65/61 |
| 2017/0041680 A1 | 2/2017 | Lewis | |
| 2017/0078811 A1* | 3/2017 | Pearson ............... | H04N 21/439 |
| 2017/0094363 A1 | 3/2017 | Miller | |
| 2017/0134498 A1 | 5/2017 | Mitchell | |
| 2017/0242656 A1 | 8/2017 | Plagge | |
| 2017/0366861 A1* | 12/2017 | Chung ............ | H04N 21/44226 |
| 2018/0089453 A1 | 3/2018 | Scholz | |
| 2018/0157745 A1* | 6/2018 | Williams .............. | G06F 16/639 |

FOREIGN PATENT DOCUMENTS

| | | | | |
|---|---|---|---|---|
| EP | 2857988 | | 4/2015 | |
| EP | 3057010 A1 | * | 8/2016 | ........... G06F 16/137 |
| EP | 3057099 A1 | * | 8/2016 | ............. G06F 16/44 |
| GB | 2473344 | | 3/2011 | |
| JP | 61153880 | | 7/1986 | |
| JP | 2007235670 | | 9/2007 | |
| KR | 20150054279 | | 5/2015 | |
| WO | 2008033472 | | 3/2008 | |
| WO | WO-2015197803 A2 | * | 12/2015 | ............. B60K 35/00 |
| WO | 2016145829 | | 9/2016 | |
| WO | WO-2016193784 A1 | * | 12/2016 | ......... G06Q 30/0251 |
| WO | WO-2016196408 A1 | * | 12/2016 | ....... G06F 17/30053 |

OTHER PUBLICATIONS

Hao, Meng et al., "The Research of Vehicle Driving Multimedia Data Recording," 2008 IEEE International Conference on Intelligent Information Hiding and Multimedia Signal Processing, 4 pages.

Hrazdira, A. et al., "Optimal Real-Time Navigation System: Application to a Hybrid Electrical Vehicle," 2012, 15th Int'l. IEEE Conference on Intelligent Transportation Systems, Anchorage, AK, Sep. 16-19, 2012, 6 pages.

Rajgopal, Vasanthakumar et al., "Automotive media player—Efficient Design and Implementation of Essential Features," 2011 IEEE International Conference on Consumer Electronics (ICCE), 2 pages.

Simmons, R. et al., "Learning to Predict Driver Route and Destination Intent," 2006 IEEE Intelligent Transportations Systems Conference, Toronto, Canada, Sep. 17-20, 2006, 6 pages.

* cited by examiner

DURATION-BASED CUSTOMIZED MEDIA PROGRAM

CROSS-REFERENCE TO RELATED APPLICATIONS

This application is a continuation of U.S. application Ser. No. 16/239,237, filed Jan. 3, 2019, now U.S. Pat. No. 11,168,996, which is a continuation of U.S. application Ser. No. 15/721,100, filed on Sep. 29, 2017, now U.S. Pat. No. 10,203,216, which claims priority to U.S. Application No. 62/441,266, filed on Dec. 31, 2016, and titled DURATION-BASED CUSTOMIZED MEDIA PROGRAM, the disclosures of which are hereby incorporated by reference in their entireties.

BACKGROUND

Many people enjoy consuming media content while travelling or during other activities. The media content can include audio content, video content, or other types of media content. Examples of audio content includes songs, albums, podcasts, audiobooks, etc. Examples of video content includes movies, music videos, television episodes, etc. Using a mobile phone or other media-playback device, such as a vehicle-integrated media playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select a desired variety of media content suitable for traveling.

SUMMARY

In general terms, this disclosure is directed to customizing media programs to match a selected duration. In one possible configuration and by non-limiting example, a media-playback device generates a customized media program that is specifically configured to provide playback of media content for the duration of a traveled route. Various aspects are described in this disclosure, which include, but are not limited to, the following aspects.

In one aspect, media playback device for customizing a media program for a specified duration comprises: a processor; a memory device encoding instructions that, when executed by the processor, cause the media playback device to: determine a duration of the media program; determine one or more preferences of a user; build a customized playlist of media content items based on the determined duration and the one or more preferences of the user; and a content output device configured to play the media content items.

In another aspect, a method of presenting a customized media program to a user comprises: determining a duration of the customized media program; building a playlist including one or more items of media content that fit the determined duration; and playing the playlist.

In yet another aspect, a system for building a customized playlist for a specific route comprises: a media-delivery system configured to communicate with a mobile device through a network, the media-delivery system comprising: a customized program server application for selecting media for a customized playlist for a specific travel route based on user preferences comprising a machine learning engine and a user preferences data store; and a media server application for accessing and streaming media content of the customized playlist.

In another aspect, computer-executable instructions are executed by one or more computing devices, causing the computing device to: receive a selection of a destination; determine a route to the destination; determine a duration of the route; determine the driving conditions of the route; determine one or more preferences of the user; build a playlist including one or more types of audio content the conform to the preferences of the user, the driving conditions of the route, and the duration of the route, wherein the playlist includes one or more news content items and one or more entertainment content items; play the playlist through a media playback device; adjust the playlist in response to changes in the duration of the route or receiving a command from the user to skip content; and conclude the playlist with an uplifting media content item selected for the user.

DETAILED DESCRIPTION

Figure 1:
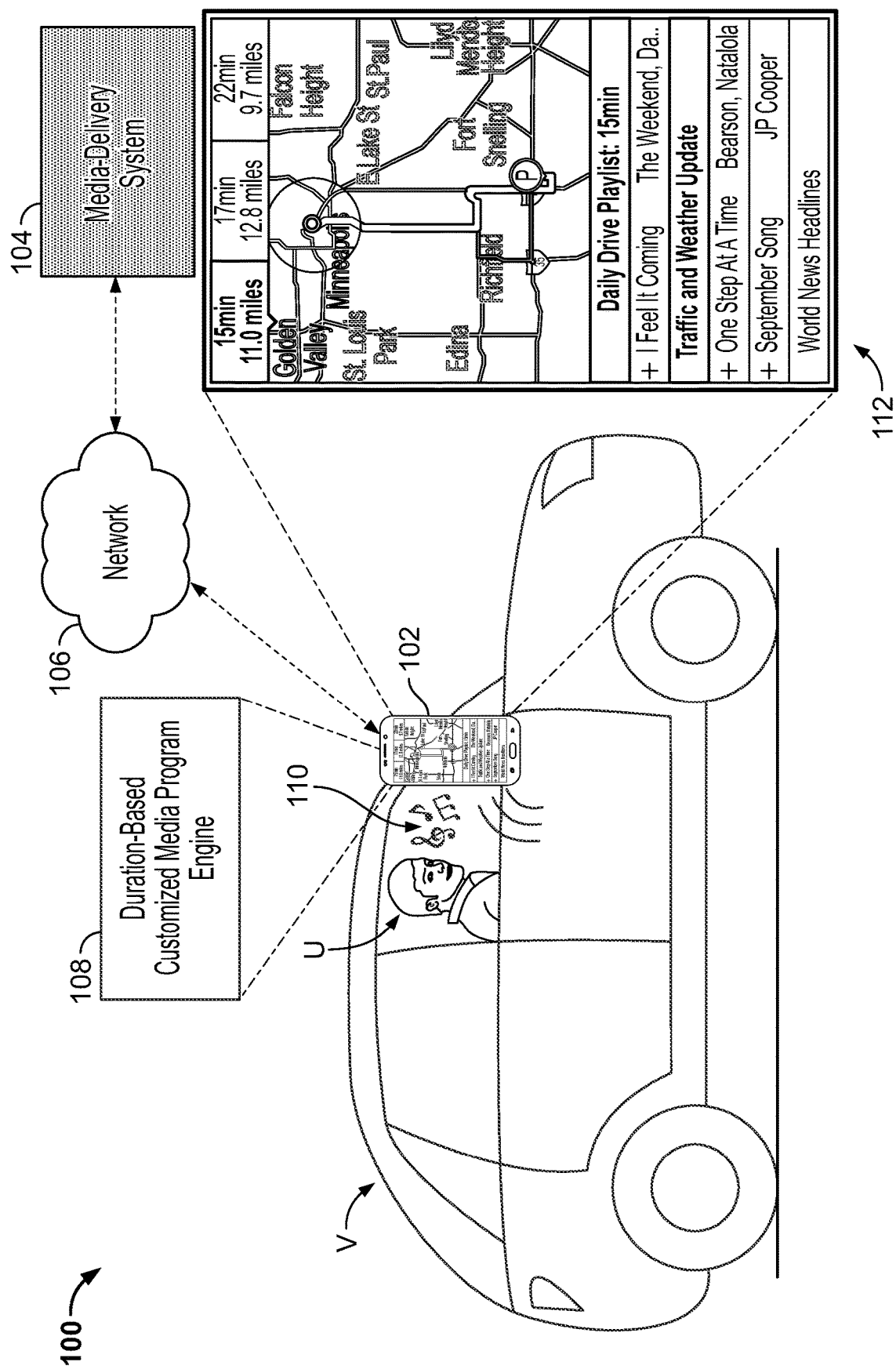
FIG. 1 illustrates an example system for customizing a media program.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content during various activities, including travelling. As used herein, the term "travel" and variants thereof refers to any activity in which a user is in transit between two locations. For example, a user is in transit when being conveyed by a vehicle, including motorized and non-motorized, public transit, and private vehicles. A user is also in transit when moving between locations by other means such as walking and running.

Enjoying media content while travelling presents many challenges. First, it can be difficult to safely interact with a media-playback device while traveling in a manner that does not interfere with travel related activities (driving, navigating, etc.) Second, desired media content may not be available or accessible in a format that can be accessed while travelling. Third, accessing media content while travelling may be difficult, expensive, or impossible depending on network availability/capacity along the route of travel. Fourth, accessing and playing back media content can require significant amounts of energy, potentially draining a battery in the media-playback device. Fifth, it can be challenging to connect a media-playback device to a vehicle-embedded audio system for playback while travelling in a vehicle. Embodiments disclosed herein address some or all of these challenges. It should be understood, however, that aspects described herein are not limited to use during travel.

For example, in some embodiments, the media-playback device includes a limited-attention interface that requires less attention from the user and/or is less distracting than a standard interface. This limited-attention interface can be useful during travelling because a user may have limited attention available for interacting with a media-playback device due to the need to concentrate on travel related activities, including, for example, driving and navigating. But the limited-attention interface can also be configured for use playing back media content during other activities that require the user's concentration, such as exercising, playing games, operating heavy equipment, reading, studying, etc.

Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, travelling (and in particular driving) is described as one example of an activity during which media content is consumed. However, it should be understood that the same concepts are similarly applicable to other forms of media consumption and to other activities, and at least some embodiments include other forms of media consumption and/or are configured for use during other activities.

FIG. 1 illustrates an example customized media program playback system 100 for media content playback during travel. The example system 100 includes a media-playback device 102 and a media-delivery system 104. The media-playback device 102 includes a duration-based customized media program engine 108. The system 100 communicates across a network 106. Also shown, is a user U who is travelling in a vehicle V. The user U may interact with the duration-based customized media program engine 108 through a user interface 112 on the media-playback device 102, resulting in media output 110.

The media-playback device 102 plays back media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include news content items, weather content items, traffic content items, music, audiobooks, music videos, movies, television episodes, podcasts, other types of audio or video content, and portions or combinations thereof.

The media-playback device 102 plays media content for the user during travel or other activities. The media content that is played back may be selected based on user input or may be selected without user input. The media content may be selected for playback without user input by either the media-playback device 102 or the media-delivery system 104. For example, media content can be selected for playback without user input based on stored user profile information, location, travel conditions, current events, and other criteria.

User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Although the media-playback device 102 is shown as a separate device in FIG. 1, the media-playback device 102 can also be integrated with the vehicle (e.g., as part of a dash-mounted vehicle infotainment system).

The duration-based customized media program engine 108 generates customized media programs for users based on a specified duration of time. In at least some embodiments, the duration-based customized media program engine 108 builds media playlists configured to accompany a user traveling in a vehicle along a particular route. The selected media in the playlist is customized to conform to the user's preferences and conditions along the route.

In some embodiments, the duration-based customized media program engine 108 receives input from a user to skip media content within a playlist during playback. In some embodiments, the duration-based customized media program engine 108 updates the playlist in response to a changed duration by adding or removing new or entertainment content. The duration may be changed in response to receiving input from the user to change the duration of the media program. In some embodiments, the duration is adjusted based on input received from the travel server application 186 which shows that a route will take more or less time than initially estimated. Additionally, the duration may be adjusted due to an interruption in playback of the playlist such as a phone call or pausing playback. In some embodiments, the duration-based customized media program engine 108 updates the playlist in response to a changed duration by adding or removing news or entertainment content. Embodiments of the duration-based customized media program engine 108 are illustrated and described further throughout.

Figure 2:
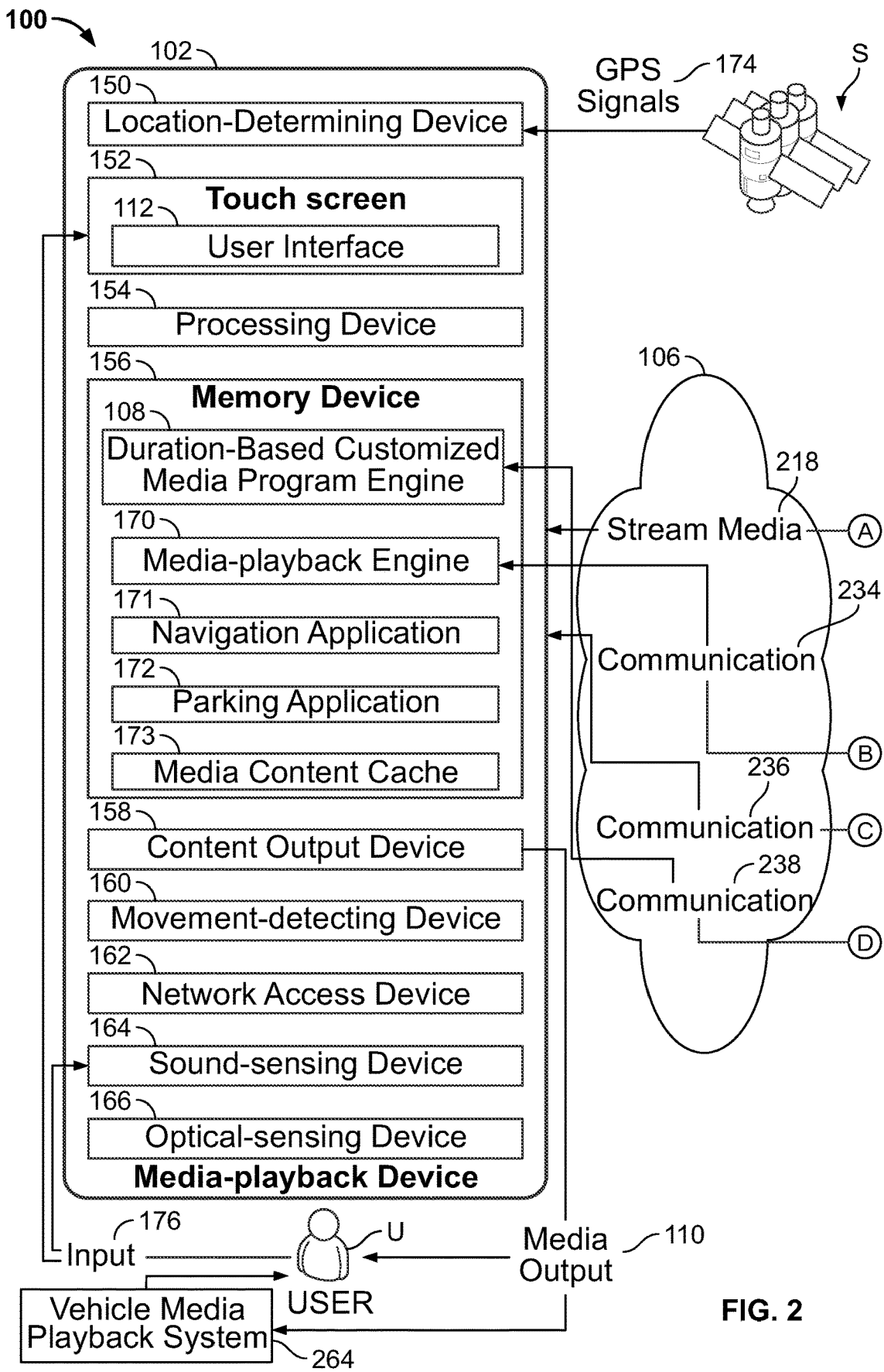
FIG. 2 is a schematic illustration of the example system of FIG. 1.
Figure 2:
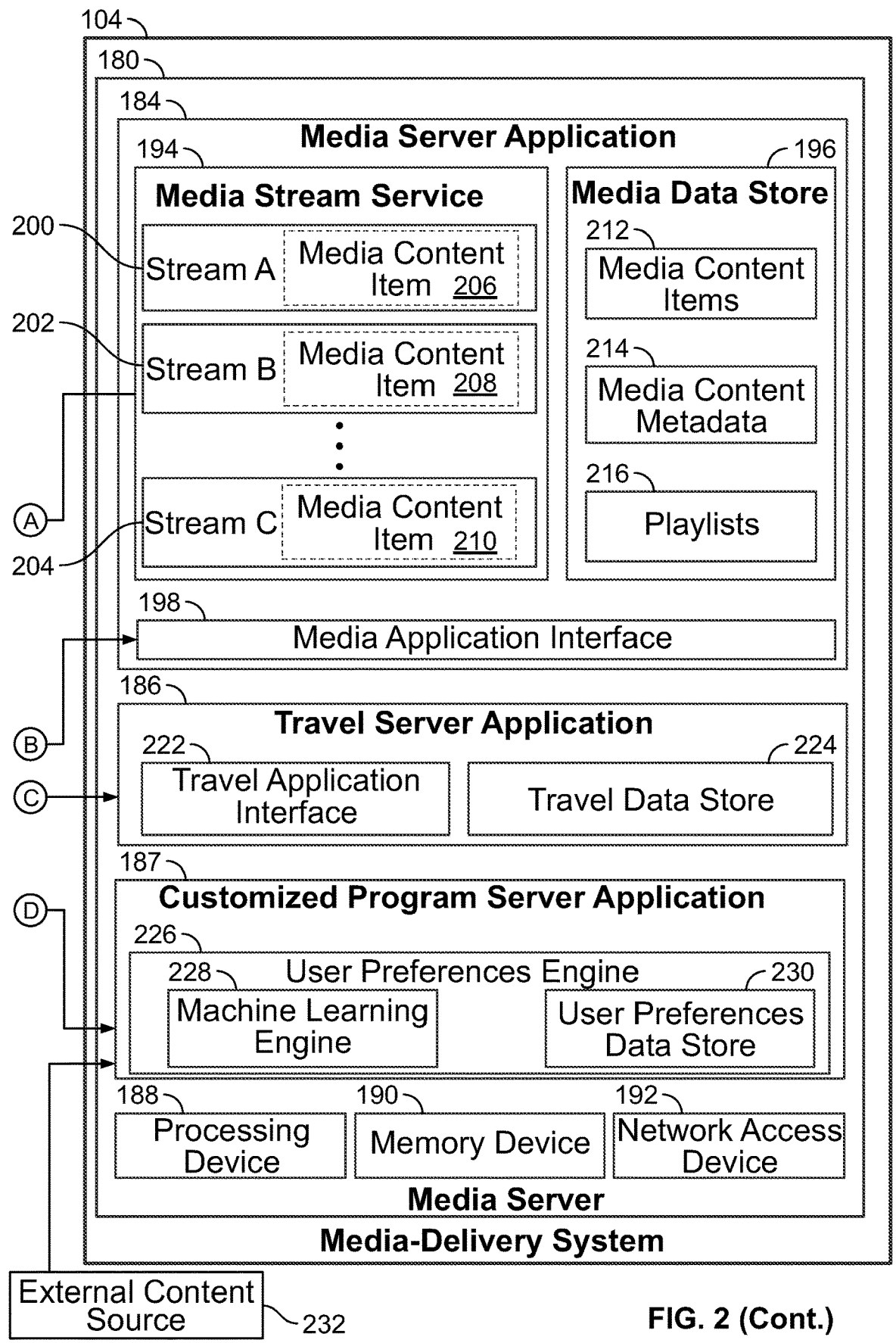

FIG. 2 is a schematic illustration of an example system 100 for media content playback during travel. In FIG. 2, the media-playback device 102, the media-delivery system 104, and the network 106 are shown. Also shown are the user U and satellites S.

As noted above, the media-playback device 102 plays media content items. In some embodiments, the media-playback device 102 plays media content items that are provided (e.g., streamed, transmitted, etc.) by a system external to the media-playback device such as the media-delivery system 104, another system, or a peer device. Alternatively, in some embodiments, the media-playback device 102 plays media content items stored locally on the media-playback device 102. Further, in at least some embodiments, the media-playback device 102 plays media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the touch screen 152, the movement-detecting device 160, the sound-sensing device 164 and the optical-sensing device 166.

The location-determining device 150 is a device that determines the location of the media-playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi positioning systems technology, and combinations thereof.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, single taps and/or swipes are recognized as inputs. In some embodiments, the touch screen 152 displays a user interface 168 for interacting with the media-playback device 102. As noted above, some embodiments do not include a touch screen 152. Some embodiments include a display device and one or more separate user interface devices. Further, some embodiments do not include a display device. In some embodiments, the user interface 168 operates to receive input from the user U to determine one or more preferences of the user U. The user U may provide input to the user interface 168 by one or more of the sound-sensing device 164 and the touch screen 152.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 170 that includes the duration-based customized media program engine 108. In some embodiments, the media-playback engine 170 selects and plays back media content and generates interfaces for selecting and playing back media content items. As described above, the duration-based customized media program engine 108 also selects media content for the user. The memory device 156 may further store instructions for a navigation application 171 and a parking application 172 in some embodiments. The navigation application 171 operates to determine routes to selected destinations. The parking application 172 operates to report the status of available parking spaces near of a location of interest to the user.

In at least some embodiments, interfaces are generated that are configured to be less distracting to a user and require less attention from the user than other interfaces generated by the media-playback engine 170. For example, interfaces may include fewer features than the other interfaces generated by the media-playback engine 170. These interfaces may make it easier for the user to interact with the media-playback device 102 during travel or other activities that require the user's attention.

Some embodiments of the memory device also include a media content cache 173. The media content cache 173 stores media-content items, such as media content items that have been previously received from the media-delivery system 104. The media content items stored in the media content cache 173 may be stored in an encrypted or unencrypted format. The media content cache 173 can also store decryption keys for some or all of the media content items that are stored in an encrypted format. The media content cache 173 can also store metadata about media-content items such as title, artist name, album name, length, genre, mood, era, etc. The media content cache 173 can also store playback information about the media content items, such as the number of times the user has requested to playback the media content item or the current location of playback (e.g., when the media content item is an audiobook, podcast, or the like for which a user may wish to resume playback). In some embodiments, the playlist can be stored in the media content cache 173 for later playback.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker assembly 268 comprising one or more speakers, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones, speaker system, or vehicle media-playback system 264. Embodiments involving transmission of media output 110 through a vehicle media-playback system 264 are further described throughout.

The movement-detecting device 160 senses movement of the media-playback device 102. In some embodiments, the movement-detecting device 160 also determines an orientation of the media-playback device 102. In at least some embodiments, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret the acceleration as indicating movement of the media-playback device 102 too.

The network access device 162 operates to communicate with other computing devices over one or more networks, such as the network 106. Examples of the network access device 162 include one or more wired network interfaces and wireless network interfaces. Examples of wireless network interfaces include infrared, BLUETOOTH® wireless technology, 802.11a/b/g/n/ac, and cellular or other radio frequency interfaces.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more vehicle are networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate the media-playback device 102 (e.g., sounds within a vehicle in which the media-playback device 102 is located). In some embodiments, the sound-sensing device 164 comprises one or more microphones. For example, the sound-sensing device 164 may capture a recording of sounds from proximate the media-playback device 102. These recordings may be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words.

Additionally or alternatively, the sound-sensing device 164 may determine various sound properties about the sounds proximate the user such as volume, dominant frequency or frequencies, etc. These sound properties may be used to make inferences about the environment proximate to the media-playback device 102 such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate the media-playback device 102. In some embodiments, the optical-sensing device 166 comprises one or more light sensors or cameras. For example, the optical-sensing device 166 may capture images or videos. The captured images can be processed (by the media-playback device 102 or an external server such as the media-delivery system 104 to which the images are transmitted) to detect gestures, which may then be interpreted as commands to change the playback of media content. Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, a travel server application 186, a customized program server application 187, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 accesses and streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 170.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. In some embodiments, the media content metadata 214 includes characteristics about media content relevant to its appropriateness for certain travel conditions. In some embodiments, the media content metadata 214 records information about one or more users' preferences related to a media content item.

The playlists 216 operate to identify one or more of the media content items 212 and assemble the media content items together into a playlist. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, era, or appropriateness for particular travel conditions. The playlists 216 may include user-created playlists, which may be available to a particular user, a group of users, or to the public.

The travel server application 186 provides travel-specific functionality for providing media content items and interfaces for accessing media content items to media-playback devices. In some embodiments, the travel server application 186 includes a travel application interface 222 and a travel data store 224.

The travel application interface 222 can receive requests or other communication from media-playback devices or other systems, to retrieve travel information and media content items for playback during travel. For example, in FIG. 2, the travel application interface 222 sends and receives communication 236 to and from the media-playback device 102.

Additionally, the travel server application 186 can process data and user input information received from the media-playback device 102. In some embodiments, travel server application 186 operates to transmit information about the suitability of one or more media content items for playback during travel. In some embodiments, the travel server application 186 may provide a list of media content items that are suited to particular geographic locations, travel conditions, modes of travel, user preferences, etc.

For example, the travel server application 186 may store metadata and other information that associates media content items with geographic locations, forms of travel, route conditions, etc. in the travel data store 224. The travel server application 186 may also store information that associates media content items with an individual or group of users' preferences for consuming that media content during travel in the travel data store 224. The travel data store 224 may comprise one or more files or databases. The travel data store 224 can also comprise files, tables, or fields in the media data store 196.

In some embodiments, the travel data store 224 stores travel media metadata. The travel media metadata may include various types of information associated with media content items, such as the media content items 212. In some embodiments, the travel data store 224 provides information that may be useful for selecting media content items for playback during travel. For example, in some embodiments, the travel data store 224 stores travel scores for media content items that correspond to the suitability of particular media content items for playback during travel. As another example, in some embodiments, the travel data store 224 stores timestamps (e.g., start and end points) that identify portions of media content items that are particularly well-suited for playback during travel (or other activities).

The customized program server application 187 coordinates with the media server application 184 and travel server application 186 to build customized media programs to present to a user through the media-playback device 102. The customized program server application 187 selects media for a customized playlist for a specific travel route based on user preferences and communicates that playlist to the duration-based customized media program engine 108 through communication 238. In some embodiments, the customized program server application 187 includes a user preferences engine 226. The user preferences engine 226 operates to learn and store preferences of a user to determine media content items to include in a playlist or program. In some embodiments, the user preferences engine 226 includes a machine learning engine 228 and a user preferences data store 230. In some embodiments, the machine learning engine 228 operates to receive communication 238 regarding user selections that indicate preferences of the user. These preferences may be stored in the user preferences data store 230 along with preferences that may have been entered by the user or received from additional sources.

Additional sources may include databases of preferences of other users. Such preferences are recorded with the user's permission to improve the recommendations of media content that are provided. In some embodiments, demographic information is requested from other users to build a demographic preferences database. The demographic preferences database can be accessed by the user preferences engine 226 to determine one or more preferences of the user based on comparison to other users having similar age, gender, geography, income, taste in media content, type of car, and/or education level.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for media playback during travel, other embodiments are possible as well. For example, in some embodiments, the media-playback device 102 includes a media data store 196 and the media-playback device 102 is configured to select and playback media content items without accessing the media-delivery system 104. Further in some embodiments, the media-playback device 102 operates to store previously streamed media content items in a local media data store 196 (e.g., the media content cache 173).

In at least some embodiments, the media-delivery system 104 can be used to stream, progressively download, or otherwise communicate music, other audio, video, or other forms of media content items to the media-playback device 102 for playback during travel on the media-playback device 102. In accordance with an embodiment, a user U can direct the input 176 to the user interface 168 to issue requests, for example, to playback media content for playback during travel on the media-playback device 102.

Figure 3:
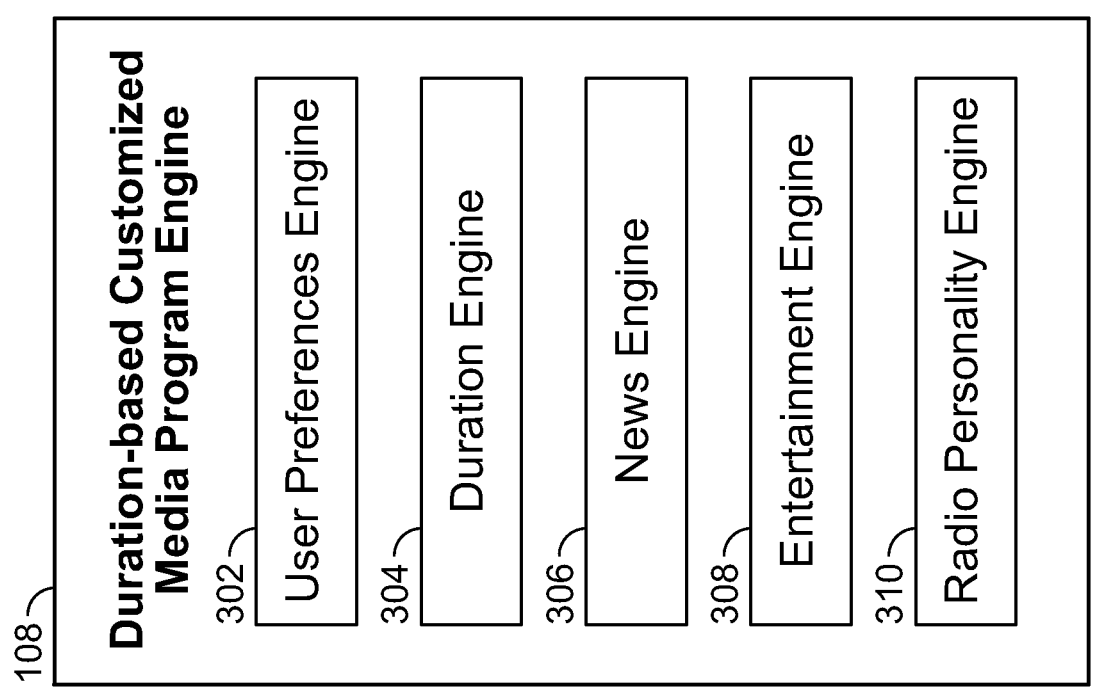
FIG. 3 is a schematic block diagram of the duration-based customized media program engine of FIG. 1.

FIG. 3 is a schematic block diagram of the duration-based customized media program engine 108. In some embodiments, the duration-based customized media program engine 108 includes a user preferences engine 302, a duration engine 304, a news engine 306, an entertainment engine 308, and a radio personality engine 310.

The user preferences engine 302 operates to access and apply previously determined user preferences to the selection of content for a customized media program. The user preferences may be accessed from a database such as the user preferences data store 230 described in FIG. 2. In some embodiments, the user preferences engine 302 receives input from a user to determine one or more of the user's preferences. For example, a user may indicate a preference to skip particular types of news content by entering the preference in a settings interface or by indicating a desire to skip that type of content by commanding the system to skip the content during playback. Skipping content is further described in reference to FIGS. 21-25. Additionally, user preferences may be determined by machine learning.

The duration engine 304 operates to determine a duration for the customized program. In some embodiments, the duration engine 304 receives a selected duration from the user through the user interface 112. This duration will remain fixed unless modified by the user. In some embodiments, the duration can change due to interruptions to playback of the playlist such as receiving a phone call or pausing the playlist.

Figure 4:
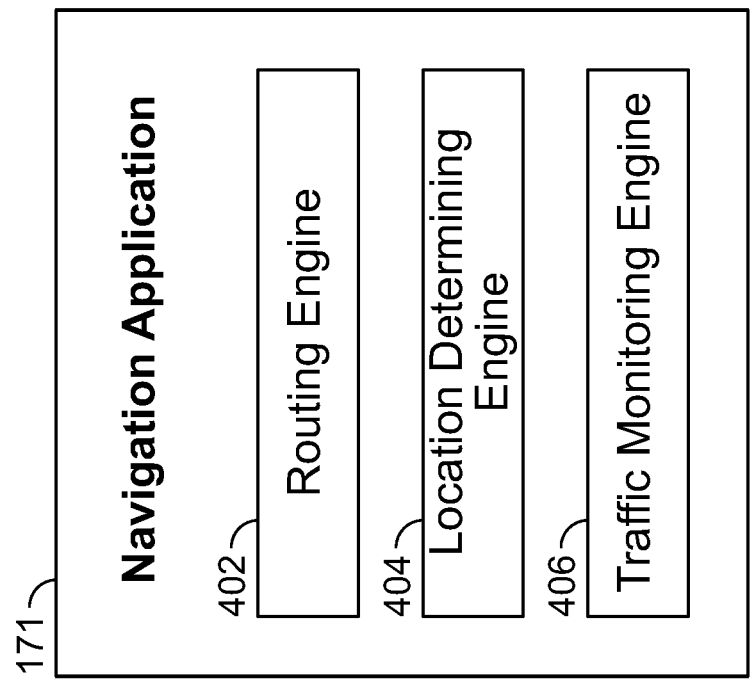
FIG. 4 is a schematic block diagram of the navigation application of FIG. 2.

In other embodiments, the duration engine 304 communicates with the navigation application 171, which is described further in FIG. 4. The navigation application 171 determines a route to destination entered by the user, determines route conditions of the route, and determines the duration of time it will take to travel that route. The duration of routes may change due to traffic conditions, detours, stops, and other unforeseen circumstances. The duration engine 304 will prompt the duration-based customized media program engine 108 to modify the customized program content in the event of changes in duration. In some embodiments, the duration is dynamically updated based on a current location of the media-playback device 102.

The news engine 306 operates to access and select news content for the customized media program. The memory device 156 encodes instructions to determine one or more news content items, weather content items, and traffic content items to include in the customized playlist of media content items. The news content is accessed through the media-delivery system 104 which receives the news content from one or more external content sources 232. The external content sources 232 provide updated news content that may be accessed in real-time during playback or in advance of building the playlist. In preferred embodiments, news content is streamed at the time of playing the media program to provide the most up to date information. The external content sources 232 are further described in FIG. 5.

The news engine 306 operates in conjunction with the user preferences engine 302 and the duration engine 304 to select appropriate types and amounts of news content items to include in a customized program. News content items include one or more of traffic reports, weather reports, world news stories, national news stories, regional news stories, local news stories, sports news stories, business news stories, politics news stories, entertainment news stories, and parking reports.

The entertainment engine 308 operates to access and select entertainment content for the customized media program. The memory device 156 encodes instructions to determine one or more audio book content items, music content items, and podcast content items to include in the customized media program. The entertainment content is accessed by communicating with the media server application 184. Media content items 212, media content metadata 214, and playlists 216 are accessed from the media data store 196 and communicated back to the duration-based customized media program engine 108. In some embodiments, entertainment content is accessed from device memory, for example, at the media content cache 173. In other embodiments, the entertainment content is streamed from the media stream service 194. The media content items 212 may include audio files and video files for music, music videos, podcasts, audiobooks, comedy programs, television shows, movies, and other types of entertainment. The entertainment engine 308 operates in conjunction with the user preferences engine 302 and the duration engine 304 to select appropriate types and amounts of entertainment content to include in a customized program.

In some embodiments, the radio personality engine 310 operates to provide spoken content to accompany the customized playlist of media content items in the form of a "radio personality." Spoken narration is provided between media content to greet the user and introduce each segment of content. The spoken word content may be prerecorded or may be generated with speech synthesis.

FIG. 4 is a schematic block diagram of the navigation application 171. In some embodiments, the navigation application 171 includes a routing engine 402, a location determining engine 404, and a traffic monitoring engine 406.

The routing engine 402 operates to determine routes from one location to a destination. Typically, the route is from a user's location to a user input destination. The routing engine 402 communicates with the location determining engine 404 to determine the location of the media-playback device 102. The routing engine 402 may determine more than one appropriate route to a destination. A user may select from multiple route options. Alternatively, the routing engine 402 may automatically select the fastest route. The routing engine 402 also determines a duration of the route.

The location determining engine 404 operates to determine the current location of the media-playback device. The location determining engine 404 communicates with the location-determining device 150 of FIG. 2 to determine the location of the user. The current location of the user may be used during travel along the route to determine if the user is ahead or behind of schedule based on the predicted route. The location determining engine 404 may determine that the user is traveling more or less quickly than predicted and will communicate that determination to the duration engine 304 of the duration-based customized media program engine 108 so that the duration of the custom media program can be adjusted.

The traffic monitoring engine 406 operates to monitor traffic conditions along the route. In the event that traffic conditions change affecting the duration of the route, the navigation application 171 will communicate an update to the duration-based customized media program engine 108. Additionally, the traffic monitoring engine 406 determines the travel conditions for the route. In some embodiments the travel conditions of a route are used to determine appropriate entertainment and news content to include in a customized program. If the traffic monitoring engine 406 detects a change in traffic, this may be communicated to the duration-based customized media program engine 108 to prompt a change in the media content included in the program presented to the traveling user.

Figure 5:
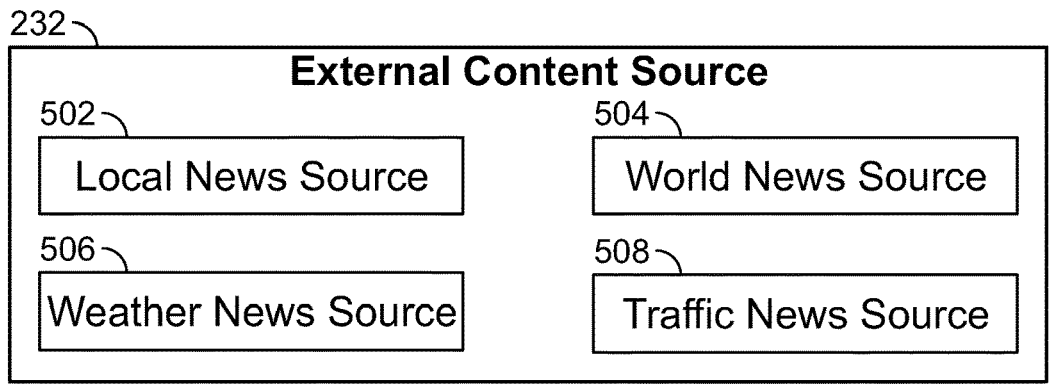
FIG. 5 is a schematic block diagram of the external content source of FIG. 2.
Figure 6:
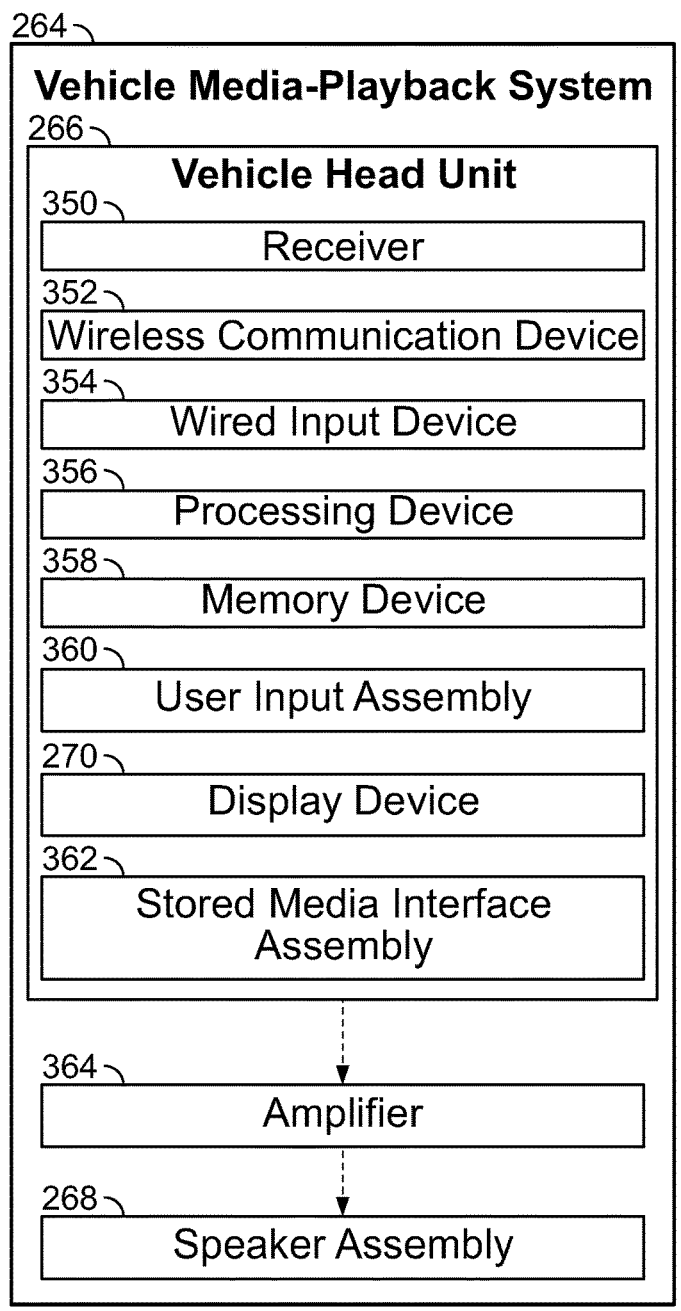
FIG. 6 is a schematic block diagram of an embodiment of the vehicle media playback system of FIG. 2.

FIG. 5 is a schematic block diagram of the external content source 232. The external content source 232 provides news content to the duration-based customized media program engine 108. In some embodiments, the news content is being continually updated with pre-recorded content. In some embodiments, the external content source 232 includes a local news source 502, a world news source 504, a weather news source 506, and a traffic news source 508. More or less sources of news may be included. Additional types of news sources may be included or multiple sources for each type of news may be included. In some embodiments the news content is downloaded to the media-playback device 102 and in other embodiments the news content is streamed to the media-playback device 102.

The local news source 502 includes local news stories and may include news stories relevant to the local area of the user, such as a metropolitan area or town. The world news source 504 includes news stories from across the world. The weather news source 506 provides weather updates for the user's general geographic area. These updates may be specific to a zip code, a city, or a region. The traffic news source 508 provides traffic news updates that are relevant to the user. The updates may be relevant to the user's metropolitan area or the user's planned route.

Figure 7:
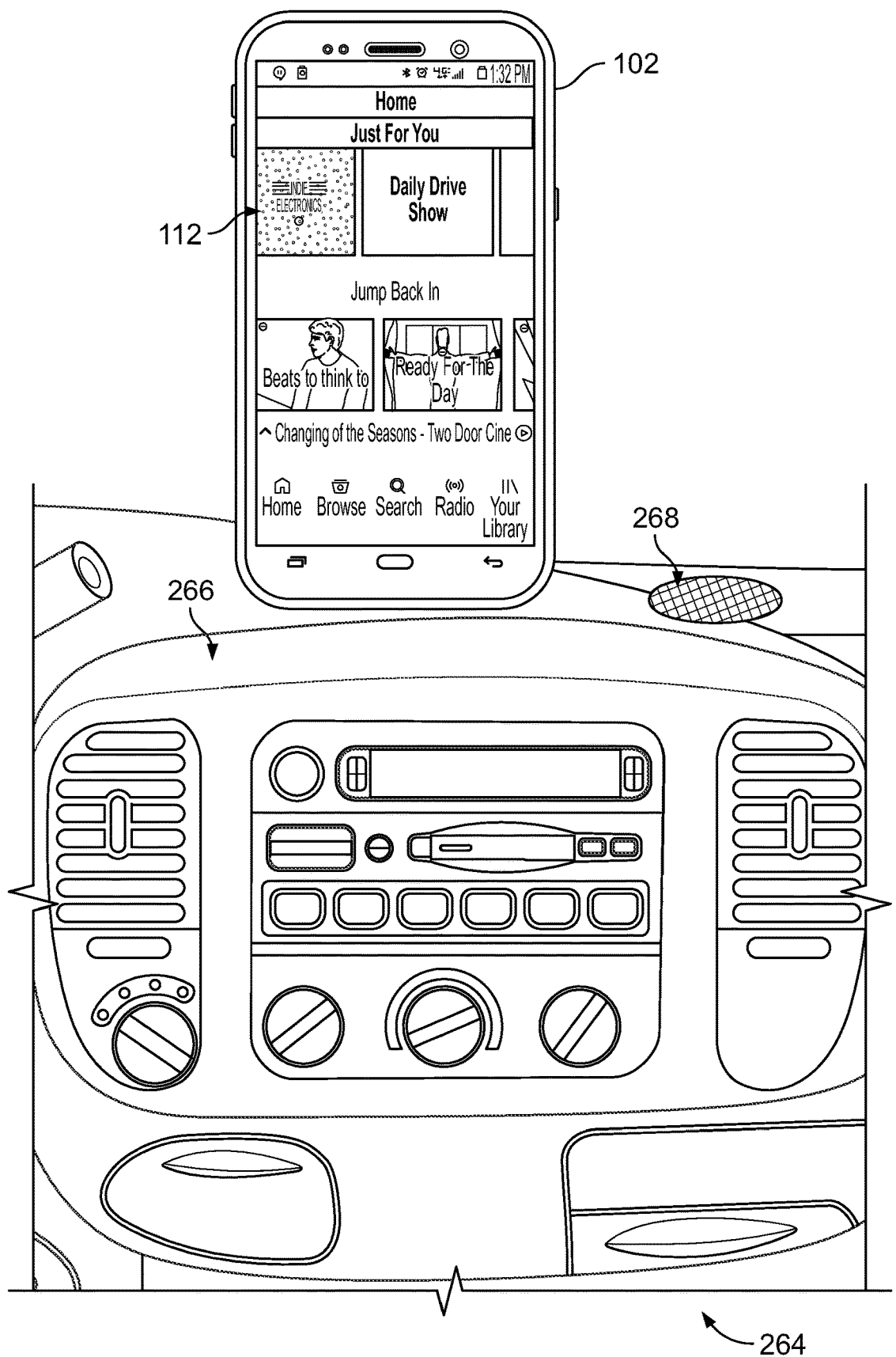
FIG. 7 shows an embodiment of the media-playback device of FIG. 1 operating within an interior cabin of a vehicle.

FIG. 7 shows an embodiment of a media-playback device 102 operating within an interior cabin of a vehicle. The user interface 112 of the media-playback device 102 shows a main screen for a media application interface 198. A user may interact with a touch screen or give verbal instruction to command the media-playback device 102 to access one or more items of media content. In this embodiment, the media-playback device 102 may operate by utilizing the vehicle media-playback system 264 to play media through the speaker assembly 268 of the vehicle head unit 266.

Figure 8:
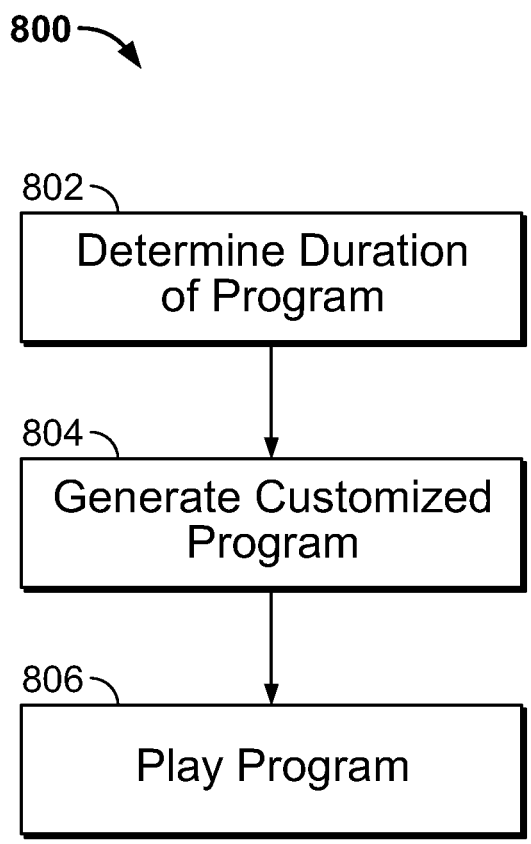
FIG. 8 illustrates an example method of customizing a media program for a specific duration performed by some embodiments of the duration-based customized media program engine of FIG. 2.

FIG. 8 illustrates an example method 800 of customizing a media program for a specific duration performed by some embodiments of the duration-based customized media program engine 108. Such a method can be used, for example, to build a playlist for a user planning a trip along a specified route. The user may be driving a car along a route of a specific duration and wants to hear both news and entertainment content customized to his or her preferences. The user may be utilizing a vehicle media-playback system, such as the vehicle media-playback system 264 of FIG. 4 and wishes to have an audio playlist that includes content that is appropriate for the amount of attention that the user requires to drive. In other embodiments, the user may be traveling by other means such as public transportation and does not need to pay attention to driving, but wants to have a media program customized to his or her preferences that lasts the duration of his or her trip. In yet other embodiments, the user may simply wish to specify a duration for a media program of customized content.

Figure 9:
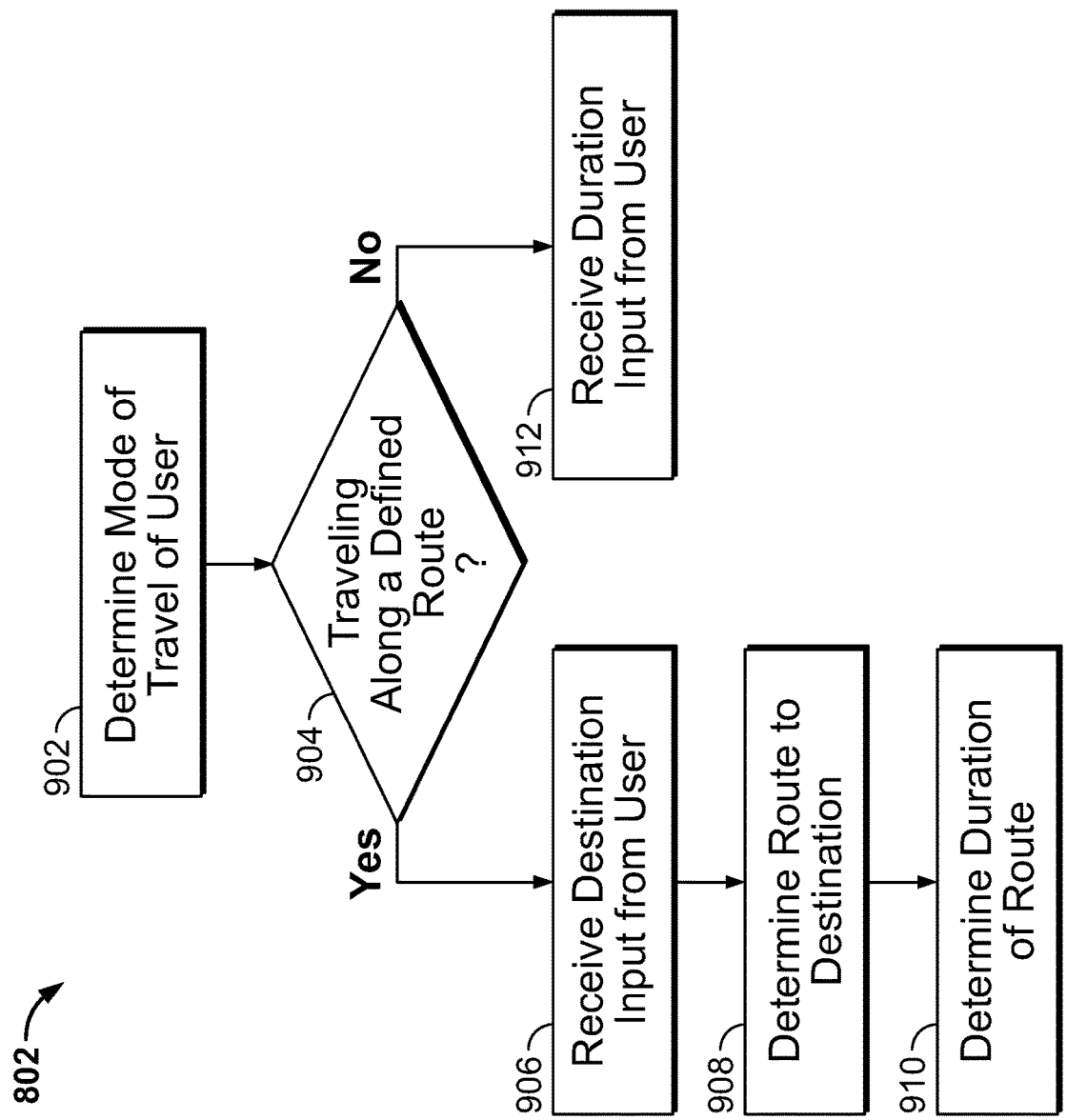
FIG. 9 illustrates an example method of determining a duration of a customized media program performed by some embodiments of the duration-based customized media program engine of FIG. 2.

At operation 802, the duration of the customized media program is determined. The duration determines the amount of media content that can be included in the program. FIG. 9 further describes determining the duration of the media program.

At operation 804, a customized media program is built including one or more items of media content to fit the specified duration. Multiple factors may be considered, which are further discussed with reference to FIGS. 12-14.

At operation 806, the customized program is played for the user. In some embodiments, the program is played directly from the content output device 158 of the media-playback device 102. In other embodiments, the program is played through a vehicle media-playback system 264 or other external audio output devices, such as Bluetooth speakers.

FIG. 9 illustrates an example method 802 of determining a duration of a customized media program performed by some embodiments of the duration-based customized media program engine 108. The duration is used to determine the amount of media content to include in the customized media program.

Figure 10:
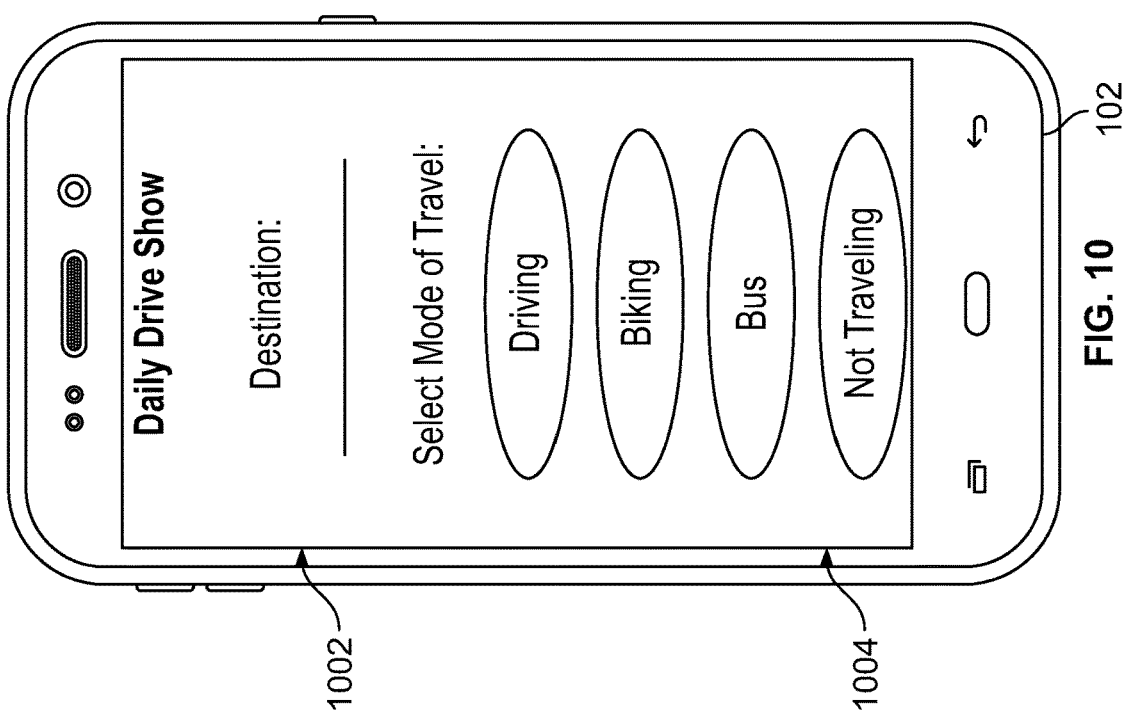
FIG. 10 illustrates an embodiment of the user interface of the media-playback device of FIG. 2.

At operation 902, the mode of travel of the user is determined. In some embodiments the user is driving a vehicle. In other embodiments, the user is traveling as a passenger in a private vehicle, in a taxi, in a train, in a bus, in a boat, or in a plane. In some embodiments, the user is traveling by means of bicycling, running, walking, skiing, or other modes of recreational travel. Finally, the user may not be traveling at all and simply wishes to listen to a customized media program of a particular duration. As is illustrated in FIG. 10, the user may select a mode of travel. In other embodiments, one or more of the location-determining device 150, movement-detecting device 160, sound-sensing device 164, and optical-sensing device 166 can be used to determine if and how the user is travelling.

At operation 904, it is determined whether the user is traveling along a defined route. Generally, this is determined by prompting the user to input a destination. As was mentioned above, the user may not be traveling at all, in which case there is no defined route. Additionally, even though the user may be traveling by a particular method, the route may not define the duration of the program. In such instances the user typically provides some input to indicate that a route is not being utilized and the method proceeds to operation 912. However, if the user is traveling to a particular destination along a particular route, the method proceeds to operation 906.

At operation 906, the user inputs the destination to which he or she is traveling. The destination may be the name of a location, an address, or an intersection. The user inputs the destination into the media-playback device 102 through the user interface 112 or by speaking the destination which is received by the sound-sensing device 164.

At operation 908, a route to the destination is determined. The navigation application 171 receives the user input destination and determines one or more routes to the destination.

At operation 910, the duration of the route is determined. The navigation application 171 calculates the estimated duration of the route based on the distance and traffic conditions along the route.

For instances where the user has not input a destination, the method proceeds from operation 904 to operation 912. At operation 912, a duration is received from the user. The user may input a desired duration of the customized media program into the media-playback device 102 through the user interface 112 or by speaking the duration which is received by the sound-sensing device 164. For example, the user may be planning to run on a treadmill for 30 minutes and wishes to listen to a customized media program that lasts for the duration of the run. In this instance the user may use the touch screen 152 to input a duration of 30 minutes.

FIG. 10 illustrates an embodiment of the media-playback device 102 operating the duration-based customized media program engine 108 on a user interface 112. The user interface 112 displays a screen with an input field for a destination 1002, as described in operation 906 of FIG. 9. There are also a plurality of selectors 1004 for choosing a mode of travel. In this example, "driving," "biking," "bus," and "not traveling" are displayed as options. In some embodiments, additional options are displayed by scrolling or by providing a different voice command. Selecting "driving" or "biking" would initiate operations 906, 908, and 910 of FIG. 9 to route the user to the destination entered in the destination input field 1002. If the user selects "bus" the user may be prompted to enter a destination and a route to the destination would be determined by accessing bus schedules and maps. Alternatively, the user may simply be prompted to enter a duration for the bus ride. Selecting "not traveling" would prompt the user to input a duration for the playlist, as described in operation 912 of FIG. 9.

Figure 11:
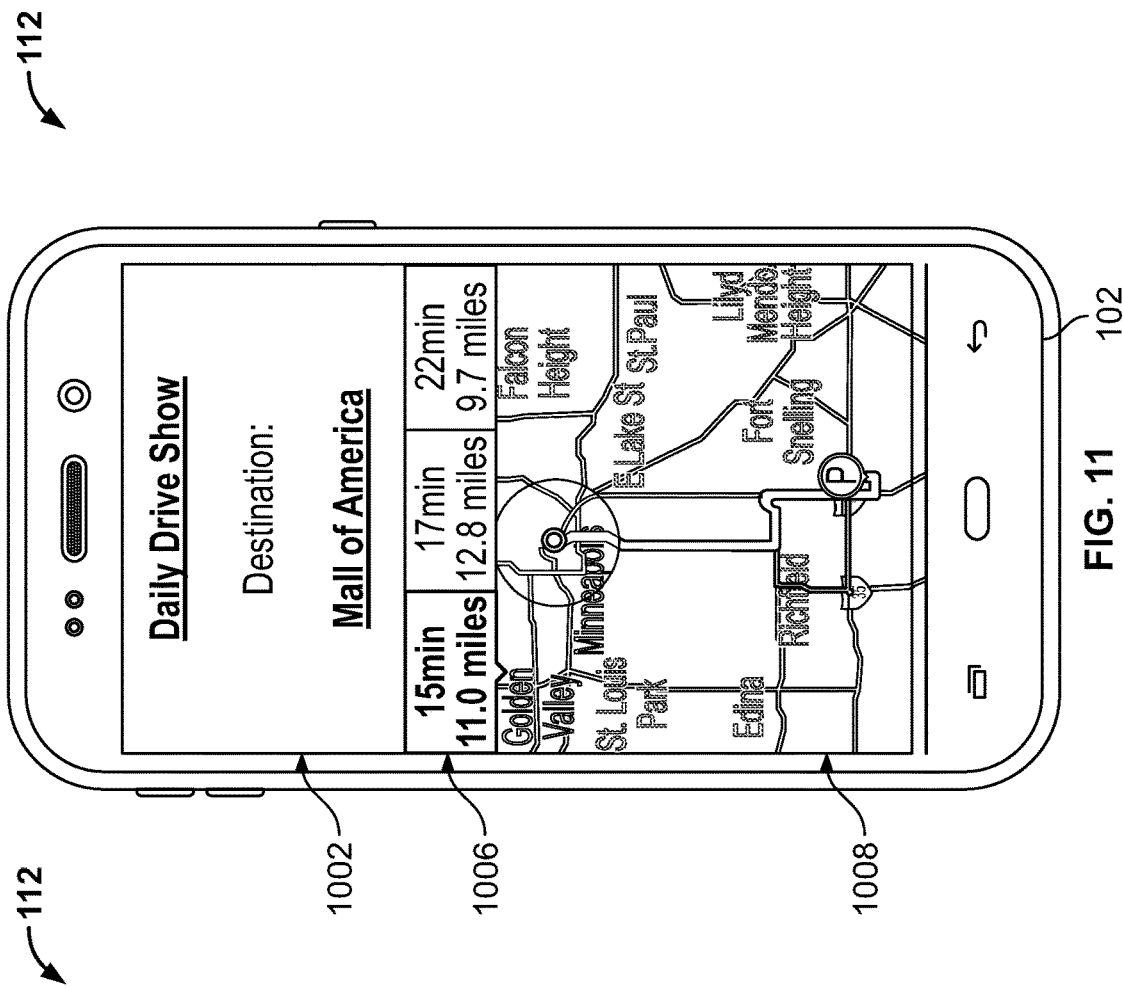
FIG. 11 illustrates another embodiment of the user interface of the media-playback device of FIG. 2.

FIG. 11 illustrates an embodiment of the media-playback device 102 operating the duration-based customized media program engine 108 on a user interface 112. The user interface 112 displays a screen showing that the navigation application 171 has determined a route 1008 and a duration of the route 1006 to the destination. In some embodiments, alternate routes may be presented, as shown in this example. The preferred route in this example has a duration of 15 minutes.

Figure 12:
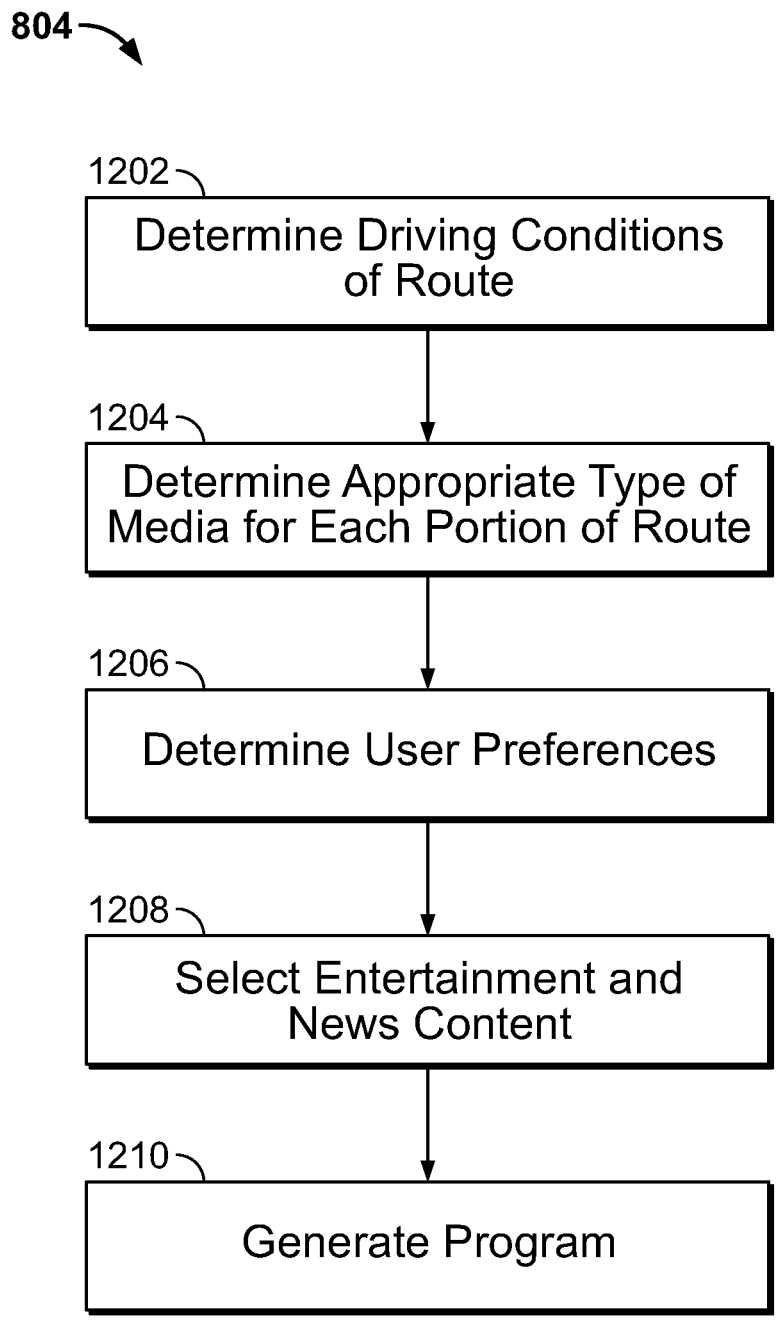
FIG. 12 illustrates an example method of generating a customized media program for a specific route performed by some embodiments of the duration-based customized media program engine of FIG. 2.

FIG. 12 illustrates an example method 804 of generating a customized media program for a specific route performed by some embodiments of the duration-based customized media program engine 108. There are many factors considered in selecting media for the customized media program.

At operation 1202, the driving conditions of the route are determined. This determination is made in conjunction with the navigation application 171 which accesses map information and traffic information from external sources. The driving conditions may be influenced by the type of road, traffic, weather, and other factors which are further discussed with respect to FIG. 13. The driving conditions affect the level of attention required by the user while driving and navigating.

At operation 1204, the appropriate type of media for each portion of the route are determined. The appropriate media is selected based on various factors, including those described in FIG. 13. For example, the driving conditions affect the level of attention required by the user while driving, so types of media that require less concentration, such as music, are preferred over types of media that require more concentration, such as an audiobook when driving conditions are more difficult. Metadata indicating how appropriate an item of media content is for particular driving conditions or levels of attention may be stored in the media data store 196 and accessed by the duration-based customized media program engine 108.

At operation 1206, user preferences are determined. User preferences influence media selection in a number of ways, which are further described with respect to FIG. 14. The user's preferences may be determined by receiving input directly from the user in the form of changing settings. In other embodiments, the user may provide feedback regarding preferences in response to prompts from the user preferences engine 226. In some embodiments, the machine learning engine 228 determines one or more user preferences by receiving and analyzing inputs from the user during use of the media-playback device 102 and media server application 184. These preferences may be stored in a user preferences data store 230. In some embodiments, the preferences of other users may be utilized to infer the preferences of the user. Such preferences of other users may be accessed from the user preferences data store 230 because the other users have one or more attributes in common with the user. User preferences determine the type of media content included in the customized media program, the amount of news content and entertainment content in the program, among other factors further discussed in FIG. 14.

At operation 1208 entertainment and news content are selected based on the route and the user's preferences. In some embodiments, entertainment content is retrieved from the media data store 196. Media may be downloaded to the media-playback device 102 or streamed using the media stream service 194. In some embodiments, news content is accessed from the external content source 232. The external content source 232 provides various types of news relevant to the time that the playlist is being generated. The types of news content are described further in FIG. 5. In some embodiments, long form content such as audiobooks or podcasts are accessed and resumed where the user stopped listening. The user may optionally select to play a particular playlist or audiobook to be integrated into the customized program.

At operation 1210, the media program is generated, placing the entertainment and news media items together in a particular order. In some embodiments a radio personality may be integrated into the program to provide narration and commentary between entertainment and news media items. In some embodiments the media program may be generated in advance of the user traveling. In such instances, the program may be cached to the media-playback device 102 so that the user does not have to rely on a data connection to stream the media content. Additional media content can be cached in case the program needs to be extended in duration. The news content is accessed and downloaded at the time the program is downloaded. In other embodiments, the media program may be generated as the user is beginning his or her travels. The user may have entered a destination and has started to travel along the route. The program is generated and begins to play as the user is traveling and the media content may be streamed or may be accessed from the memory device 156 of the media-playback device 102. News content is then accessed at the time the playlist is generated or even as the news content is being played for the user.

Figure 13:
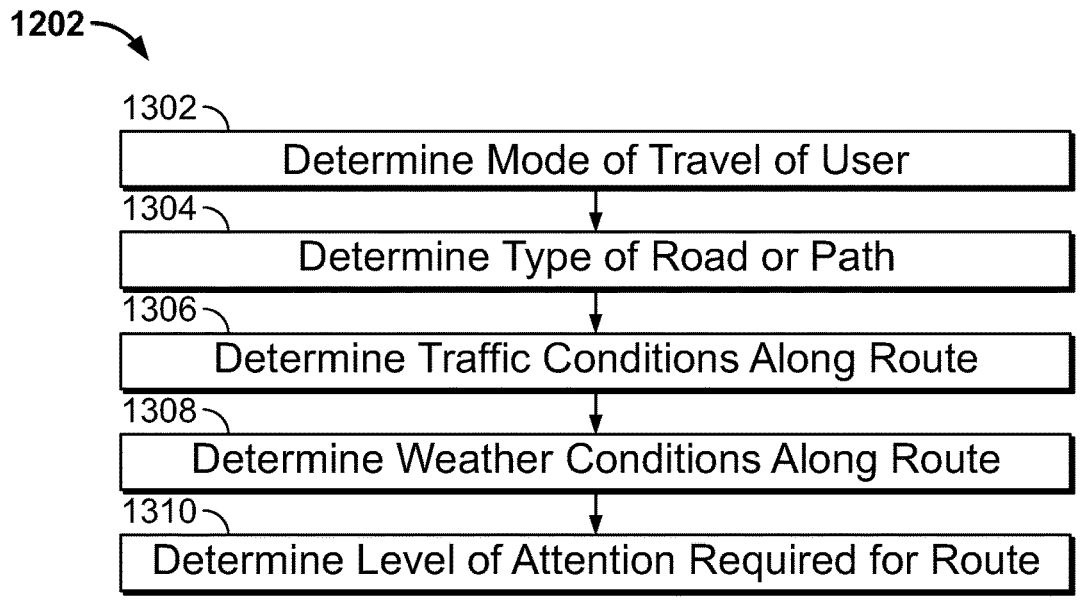
FIG. 13 illustrates an example method of determining travel conditions of a route performed by some embodiments of the duration-based customized media program engine of FIG. 2.

FIG. 13 illustrates an example of the method 1202 of determining travel conditions of a route as described in FIG. 12. Various factors are considered for one or more segments of a user's route to determine the level of attention required by the user to navigate and/or travel along that route.

At operation 1302, the mode of travel of the user is determined. The mode of travel may be selected from driving, biking, running, and the like. In some embodiments, the mode of travel is determined as described with respect to operation 902 of FIG. 9. As was mentioned above, in some instances the user may not be traveling, in which case the remaining operations of the method would not apply. However, for users who are traveling and navigating, the mode of travel influences the level of attention that the user needs to safely navigate the route. For instance, driving a vehicle requires much more attention than walking. In some cases, the user may be traveling, but is not navigating. For example, the user could be a passenger in a vehicle such as a taxi or a bus and does not need to pay attention to driving or navigating. However, if the user is driving a vehicle, riding a bike, or running, the user will need to pay a certain amount of attention to navigation and traffic.

At operation 1304, the type of road or path is determined. This determination may be made for multiple segments within the same route. Each route may have multiple types of roads or paths. Each segment of the route is analyzed. For example, a route may begin with suburban streets, then transition to a gravel road in the country, and then end with an interstate. While running, a user may be on a paved running path, a trail through the woods, a county road, and the like. For example, for driving a vehicle, the types of roads may include suburban streets, county roads, city streets, highways, and interstates. Driving on a city street in an area with a lot of pedestrians may require more attention from a driver than a straight stretch of interstate highway with light traffic. In some embodiments, the route may take the user on a bike trail or sidewalk if the user is running, biking, or the like. Running on a controlled path will typically require less attention than running on or near streets with heavy vehicular traffic.

At operation 1306, the traffic conditions along the route are determined. The duration-based customized media program engine 108 may communicate with the traffic monitoring engine 406 of the navigation application 171 to determine current traffic conditions along the route. Greater amounts of traffic require more attention from the traveling user than routes with less traffic.

At operation 1308, the weather conditions along the route are determined. The user requires less attention to travel in good weather than in bad weather. For example, traveling in a thunderstorm requires more attention than traveling on a sunny day, affecting the type of media content that is chosen for the customized media program. The weather conditions may be determined by accessing a weather news source from the external content source 232. In some embodiments, weather conditions along a route may be inferred from traffic information obtained from the navigation application 171.

At operation 1310, the level of attention required for the route is determined. The factors in operations 1302, 1304, 1306, and 1308 are combined to determine how much attention is required of the user while traveling along each segment of a route. The level of attention may differ at each segment of the route. For instance, a segment of driving on a county road with little traffic during favorable weather conditions will require very little attention from the driver, allowing him or her to focus on more content-heavy media items. However, a segment of driving on a crowded freeway while it is sleeting will require most of the driver's attention, leaving little remaining to focus to media content.

Figure 14:
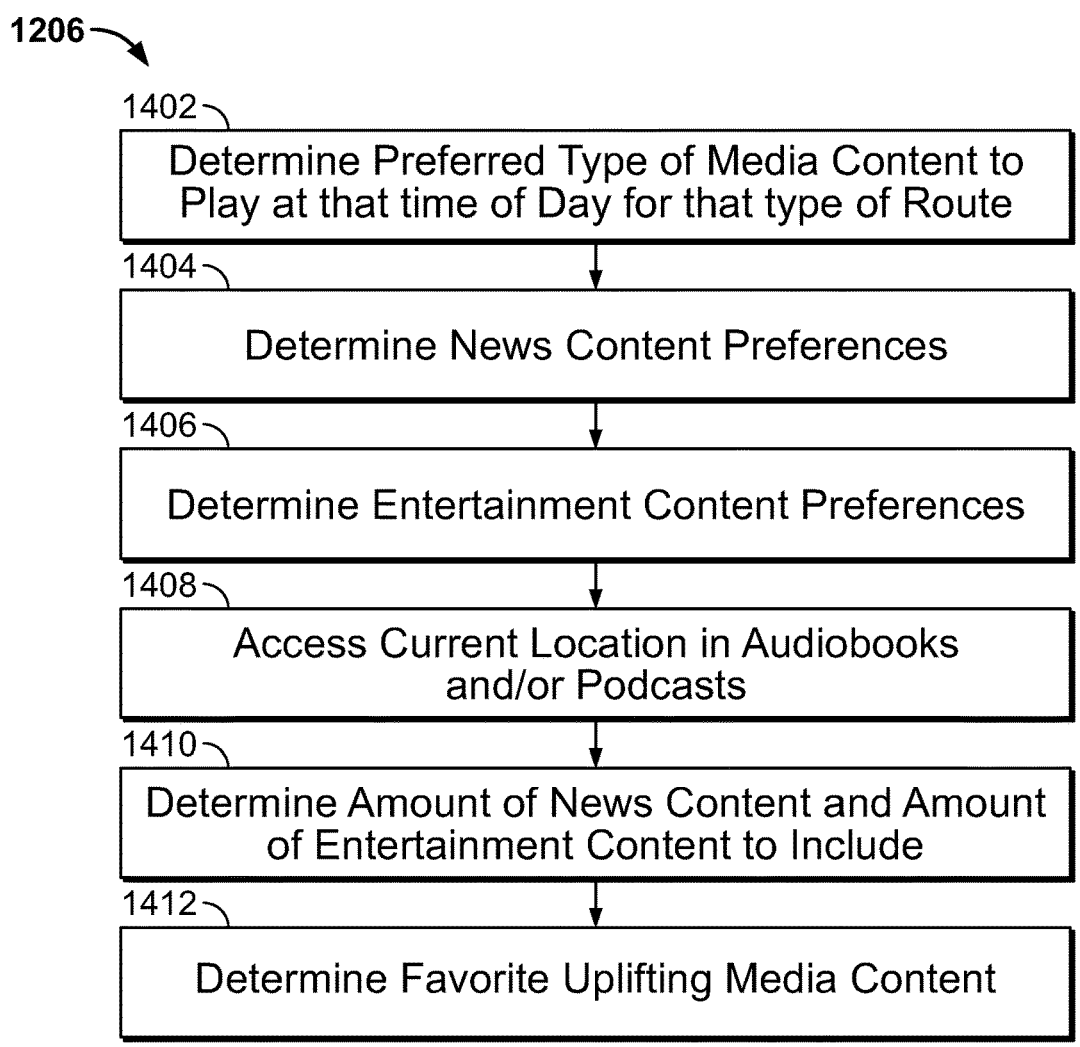
FIG. 14 illustrates an example method of determining user preferences for media content that is performed by some embodiments of the duration-based customized media program engine of FIG. 2.

FIG. 14 illustrates an example of the method 1206 of determining user preferences as described in FIG. 12. Various factors are considered to select appropriate entertainment and news content for each segment of the route. User preferences are important for selecting media content that is customized to the user.

At operation 1402, the preferred type of media content to play at that time of day for that type of route for that user is determined. As was just discussed, there are various attributes of routes that can be considered when choosing media content for a customized program. In addition, each user may have preferences regarding types of media content to be playing at particular times or with certain route conditions. For example, a user may prefer to listen to rock music during a morning commute, but prefers jazz music during an evening commute. In another example, a user may prefer to listen to audiobooks during long trips, but prefers news stories for short trips. In yet another example, a user may prefer to listen to podcasts during portions of routes with less traffic and classical music for portions of routes with heavy traffic. In yet another example, a user may prefer to listen to more news content in the morning and more music content in the afternoon. Such preferences can be determined directly with user input or may be inferred by machine learning or extrapolating the user's other preferences to apply to other aspects of the program. In some embodiments, preferences of other users may be accessed to infer the user's preferences, particularly when the user and the other users have one or more attributes in common.

At operation 1404, the user's news content preferences are determined. The preferences of the user may be inferred from other preferences, learned by machine learning, or determined by receiving input from the user. Preferences may include an amount of news content to include in a customized playlist, whether the user prefers to only hear headlines or wants to hear full stories, the types of news content to include, and which geographic area is of interest to the user. Input could be received from the user in advance of building a playlist or may be received from the user during playback of a customized playlist. For instance, if the user opts to skip sports news three days in a row, the user preferences engine 226 will determine that sports news should no longer be included in the user's customized media program. Alternatively, the user preferences engine 226 could prompt the user for feedback after skipping sports news the first time to determine if the user would always like to skip sports news. In some embodiments, the user preferences engine 226 may prompt the user to select alternative news content to replace the skipped content, such as arts and culture news. In yet another embodiment, the user may simply enter a preference to skip sports news content by selecting one or more preferences in a setup page of the customized program server application 187.

At operation 1406, the user's entertainment content preferences are determined. These preferences may include whether the user prefers music over podcasts or audiobooks. Other preferences may include preferred genres of music, preferred musical artists, preferred songs, preferred genres of audiobooks, preferred authors of audiobooks, preferred types of news content, the user's listening preferences based on time of day, preferred types of videos, preferred sports teams, preferred amounts of news and entertainment content, preferred geographic area, and preferred types of content. The entertainment preferences of the user may be determined by user input, machine learning, or by accessing the user preferences data store 230. The user's previous media content listening behavior and preferred media content playlists can influence the user's preferences for entertainment content. The previous listening behavior can be while traveling, not while traveling, or both.

At operation 1408, the user's current location in audiobooks and/or podcasts is determined. When a user is in progress of listening to a long item of media content, the duration-based customized media program engine 108 can determine the point in the media at which the user stopped listening and resume the media at that same point. Metadata is utilized to mark the stopping point of the user in the audiobook and/or podcast. If the user is not currently listening to an audiobook or podcast, this content may be skipped or an audiobook or podcast may be suggested to the user based on past listening behavior and preferences.

At operation 1410, the amount of news content and the amount of entertainment content to include in the program is determined. The user may prefer to hear mostly entertainment content, mostly news content, or a blend of the two. In some instances, these preferences may be determined based on the duration of the customized media playlist or the time of day. In some embodiments, more media content is selected than is needed to fill a particular duration in order to have backup content in case any media content is skipped or the duration of the program increases. Such preferences may be stored in the user preferences data store 230.

At operation 1412, the user's favorite uplifting media content is determined. The uplifting media content may be a favorite song, an upbeat song, a comedy show segment, a motivational speech, and the like. The user's preferences may be determined by previous listening behavior, machine learning, or user input.

One technique for identifying uplifting media content, or media content having any other desired characteristic, is to build and train computer models that can then be used to identify media content having the desired characteristics. Techniques for building models and training are described in U.S. Patent Application No. 62/347,642, filed Jun. 9, 2016 and titled Identifying Media Content, the disclosure of which is incorporated by reference herein in its entirety. These same techniques can be used by the system 100 disclosed herein for identifying media content items having desired characteristics.

Figure 15:
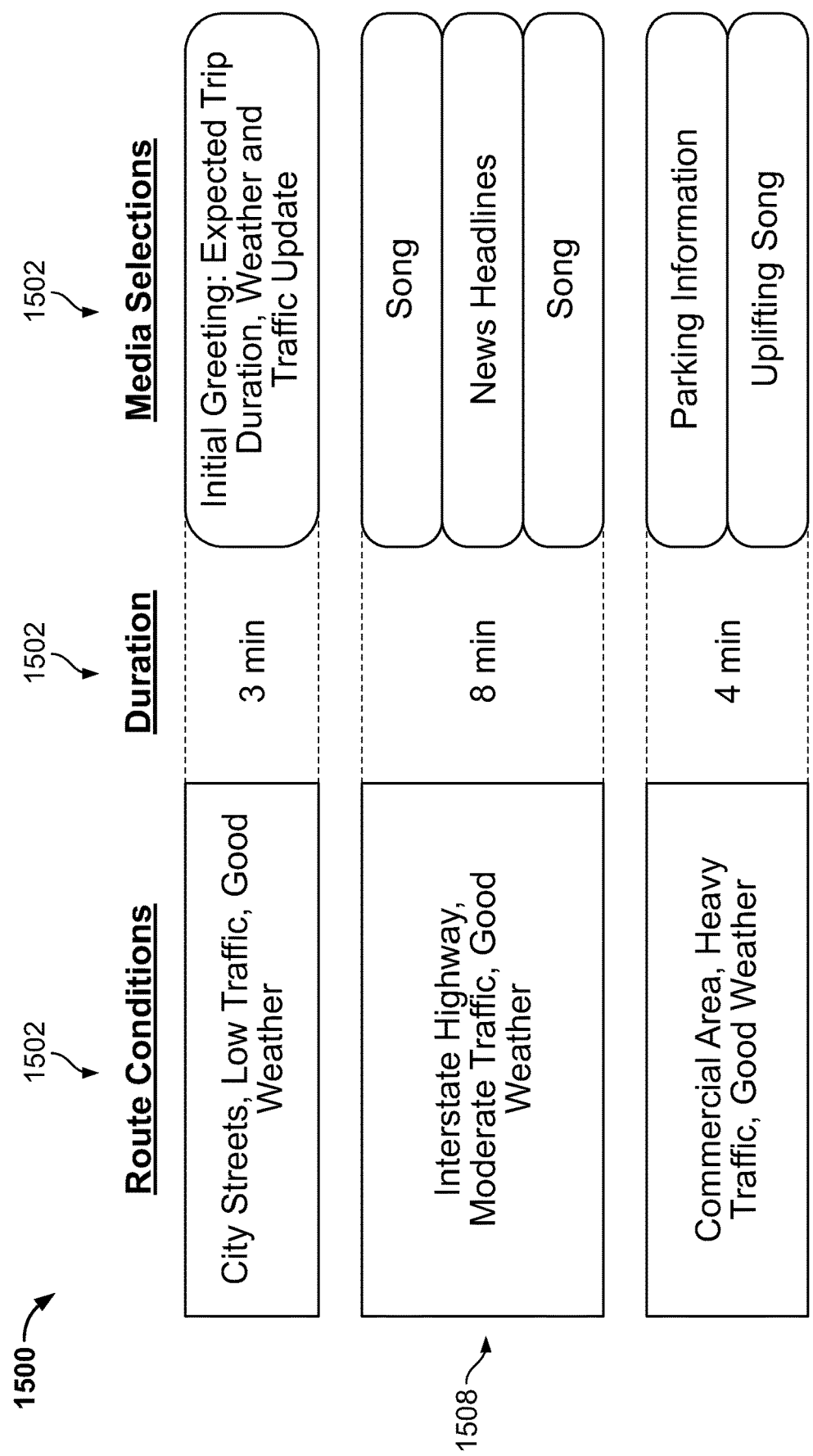
FIG. 15 shows a diagram of an exemplary media program customized for a particular route.

FIG. 15 illustrates a diagram 1500 of an exemplary media program customized to a user's route. The route conditions 1502 indicate the type of road, level of traffic, and weather conditions for each segment 1508 of the route. The duration 1504 indicates how long each segment 1508 is expected to take to travel. The media selection 1506 indicates the type of media content that is played for each segment 1508 of the route. The diagram 1500 shows an example program customized for a user driving from downtown Minneapolis to the Mall of America. In this example, the route begins with 3 minutes of driving on city streets with low traffic in good weather. During this segment an initial greeting is played for the user which includes the expected trip duration along with traffic and weather updates. Then the user travels on an interstate highway in moderate traffic with good weather for 8 minutes. During this time a song is played, followed by news headlines, and another song. Then, for 4 minutes, the user drives in a commercial area with heavy traffic in good weather. Parking information is provided for parking at the Mall of America and then the drive finishes with an uplifting song.

Figure 16:
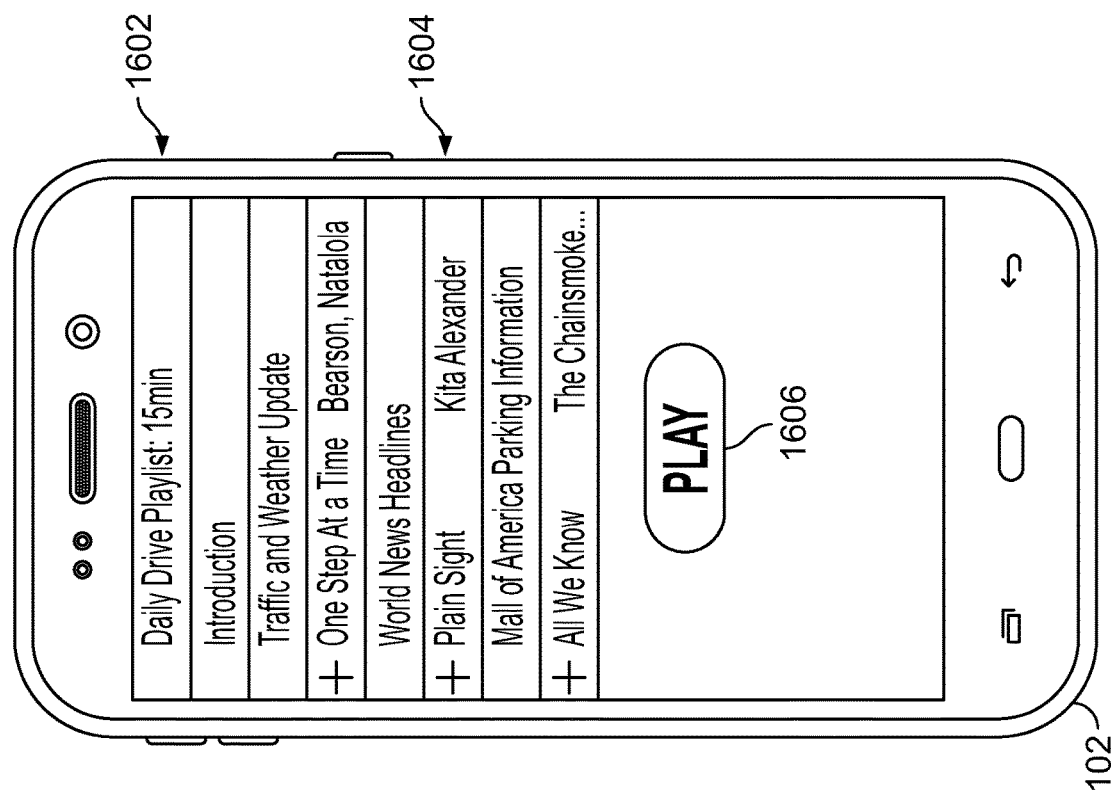
FIG. 16 shows an embodiment of a user interface displayed on the media-playback device of FIG. 2

FIG. 16 shows an embodiment of a user interface 112 displayed on the media-playback device 102 just after the user's customized media program is generated. The duration of the program 1602, 15 minutes, is displayed along with a preview of the media content included in the program playlist 1604. The user may select play 1 duration-based to initiate playback of the program or may speak to command the user interface 112 to initiate playback. In some embodiments, playback of the program may initiate automatically.

Figure 17:
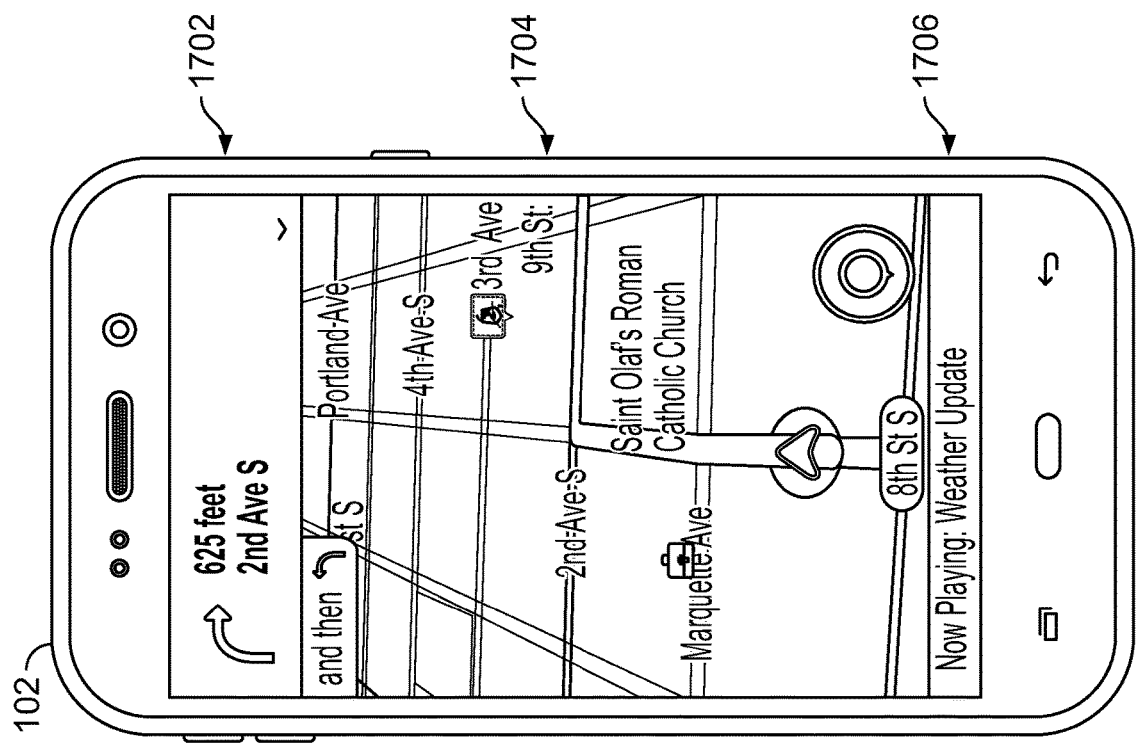
FIG. 17 shows other embodiment of a user interface displayed on the media-playback device of FIG. 2

FIG. 17 shows an embodiment of a user interface 112 displayed on the media-playback device 102 as the user begin to travel along the route to his or her destination. In this example, the user interface 112 displays navigation directions 1702 along with a map 1704 of the segment of the route the user is traveling on. The display also includes what is currently playing 1706, which is "weather update". In some embodiments the currently playing information may be announced verbally to the user instead of, or in addition to, being displayed on the user interface 112.

Figure 18:
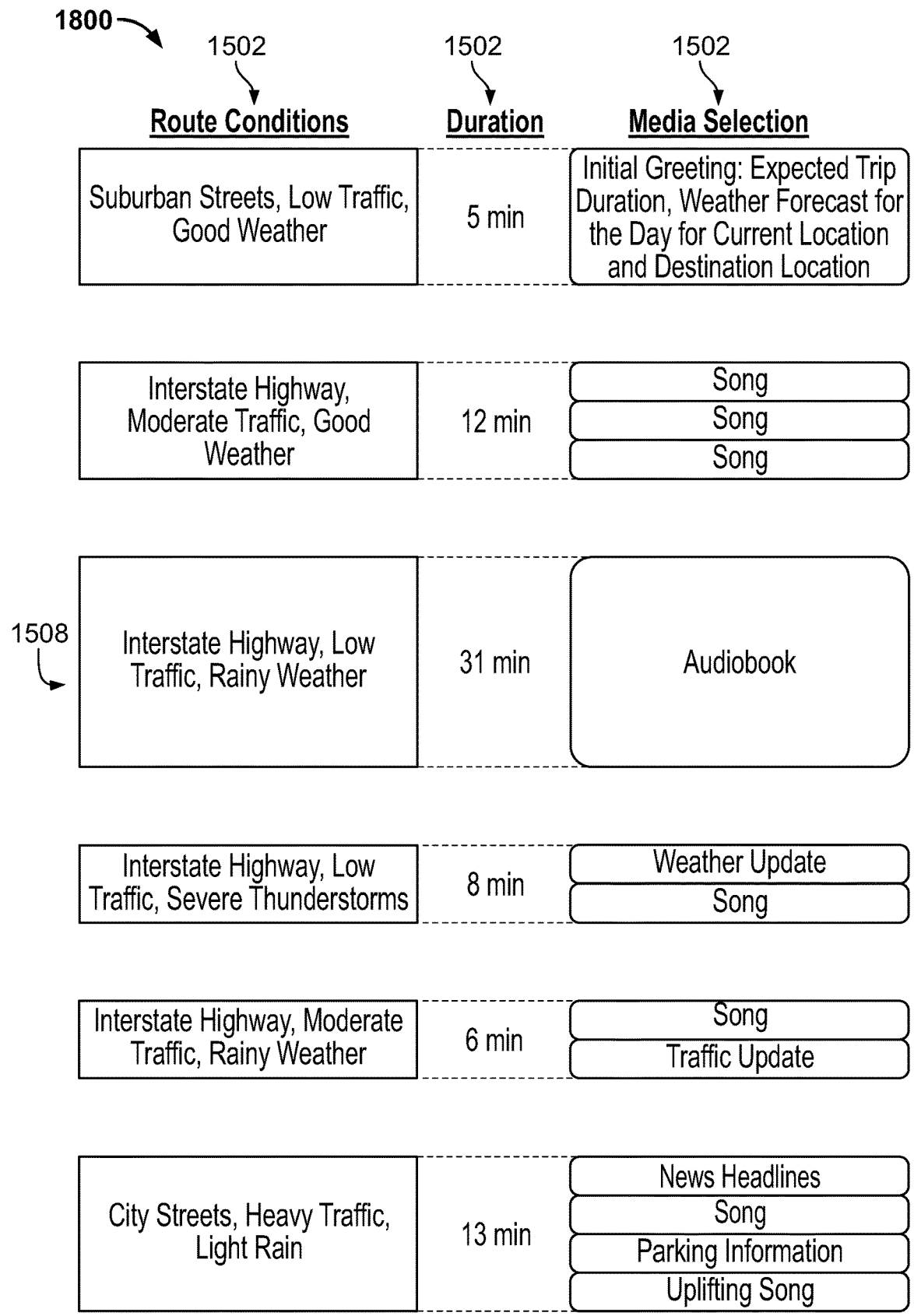
FIG. 18 illustrates another diagram of an example customized media program.

FIG. 18 illustrates another diagram 1800 of an example media program customized for a user taking a longer drive to another city. The first segment of the trip begins on suburban streets in low traffic with good weather and lasts for 5 minutes. During this time an initial greeting is played for the user which includes the expected trip duration along with the weather forecast for the day for the user's current location as well as the user's destination location. Next, for 12 minutes the user is driving on an interstate highway in moderate traffic with good weather. Three songs are played during this time. Once the user begins to travel on the interstate highway with low traffic and rainy weather, the media content shifts to an audiobook which is played for 31 minutes. As the weather worsens to severe thunderstorms, the media content changes again to a weather update and a song, which lasts for 8 minutes. Then, the weather improves slightly to "rainy weather" but the traffic becomes "moderate" for the next 6 minutes. During that time another song is played followed by a traffic update for the area around the user's destination. For the last 13 minutes, the user is traveling on city streets in heavy traffic with light rain. The program concludes with news headlines, a song, parking information for the destination area, and an uplifting song.

Figure 19:
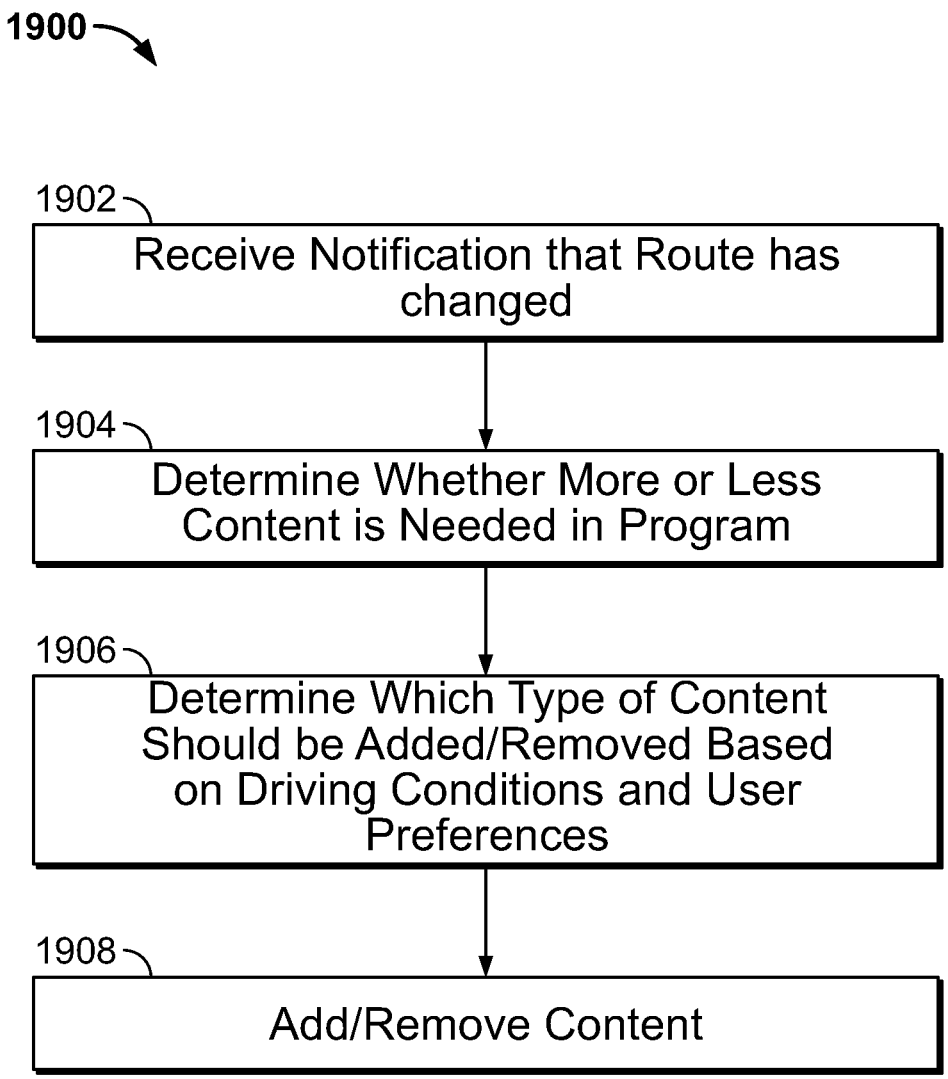
FIG. 19 illustrates an example method of adjusting media content is a customized media program in response to changes in a route duration that is performed by some embodiments of the duration-based customized media program engine of FIG. 2.

In some embodiments, the customized media program duration may be adjusted in response to user input or changes in the route a user is traveling on. FIG. 19 illustrates an example method 1900 of adjusting media content in a customized media program in response to changes in route duration that is performed by some embodiments of the duration-based customized media program engine 108. The duration of the route could change due to one or more of traffic conditions, detours, and stops. In some embodiments, the customized media program duration could be shortened due to making or receiving a phone call during playback or pausing playback of the program for other reasons. A more detailed analysis of the reason for the change in duration of the media program is provided in FIG. 20.

At operation 1902, the navigation application 171 communicates a notification to the duration-based customized media program engine 108 that the duration of the route has changed. The duration may increase or decrease depending on driving conditions, detours, or stops made along the route.

At operation 1904, the duration-based customized media program engine 108 determines whether the customized media program needs more or less media content. Media content may be added or removed at any point in the program.

At operation 1906, the duration-based customized media program engine 108 determines which type of content should be added or removed based on the driving conditions and user preferences. In some embodiments, media content is preferably removed from the middle of the program so that the program can begin with important information and end with uplifting media content.

At operation 1908, the selected content is added or removed to adjust the customized media program duration to match the route duration.

Figure 20:
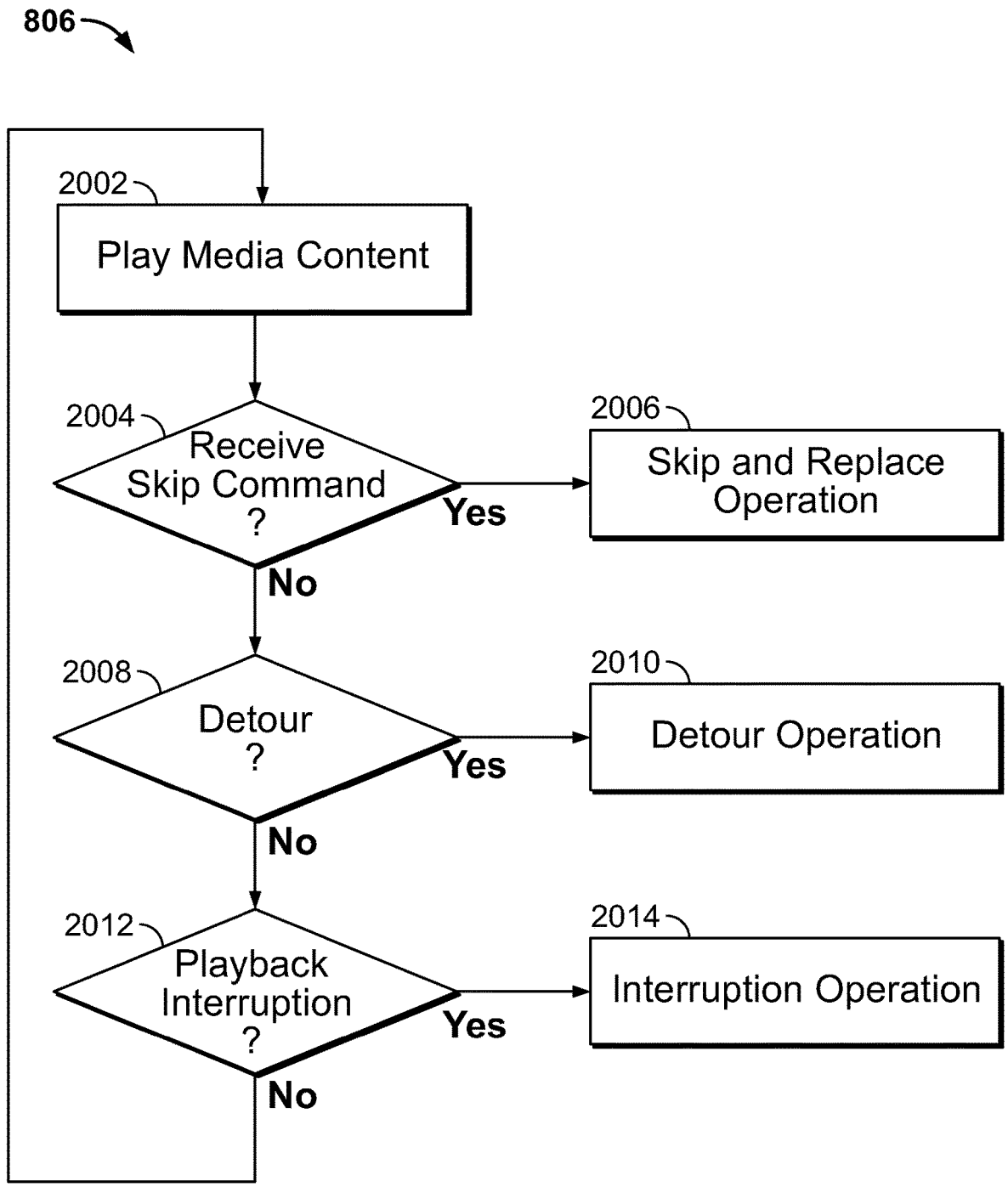
FIG. 20 illustrates an example method of playing a customized media program that is performed by some embodiments of the duration-based customized media program engine of FIG. 2.

FIG. 20 illustrates an example method 806 of playing a customized media program, as was first described in FIG. 8. The method 806 determines whether playback of the media program needs to deviate from the original playlist.

At operation 2002, the media content in the customized media program is played.

At operation 2004, if a skip command is received from the user, the playback process continues to operation 2006 to skip and replace media content within the playlist. This operation 2006 is further described in FIGS. 21-25. Otherwise playback continues.

At operation 2008, if notification of a detour is received from the navigation application 171, the playback continues to operation 2010. The detour operation 2010 is further described in FIGS. 26-28.

At operation 2012, if playback is interrupted for any reason, the playback process continues to the interruption operation 2014. This operation 2014 is further described in FIGS. 29-31. If playback continues without interruption, the program will continue to play as originally planned.

Figure 21:
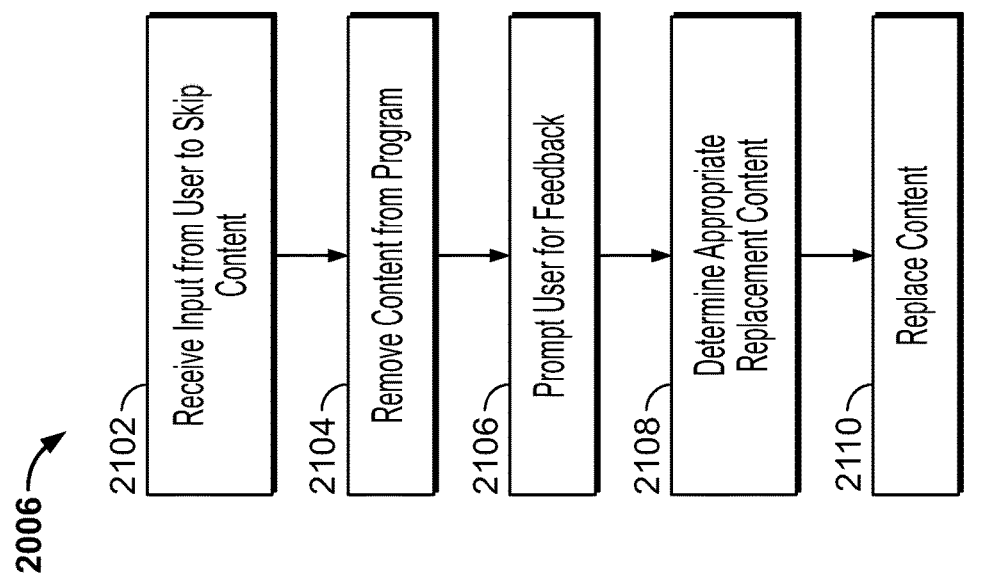
FIG. 21 illustrates an example method of replacing skipped media content in a customized media program that is performed by some embodiments of the duration-based customized media program engine of FIG. 2.

FIG. 21 illustrates an example of the skip and replace operation 2006 of FIG. 20. This method of replacing skipped media content in a customized media program is performed by some embodiments of the duration-based customized media program engine 108.

At operation 2102, input is received from the user to skip one or more media content items. The user may skip one media content item at a time or may skip a whole segment of media content. For example, the user could be listening to a news story and wishes to skip ahead. The user could indicate whether to skip just that one news story or skip the whole news section of media content that is upcoming in the customized media playlist. In some embodiments this input is received through the touch screen 152 or the sound-sensing device 164 of the media-playback device 102.

At operation 2104, the media content item is removed from the customized media program.

At operation 2106, the user is optionally prompted to provide feedback on the user's preference for skipping or replacing the media content. The user may be requested to select a type of replacement content or be asked if that particular type of content should always be skipped in future programs. In other embodiments, the duration-based customized media program engine 108 may automatically replace the skipped media content with new replacement content. The replacement content is determined by accessing the user's preferences.

At operation 2108, appropriate replacement media content is determined to replace the removed media content item. The appropriate replacement media content item is selected based on route conditions and user preferences, as described in FIGS. 13-14. Additionally, the user's feedback in operation 2106 may be used to select replacement media content.

At operation 2110, the media content is replaced in the customized media program. The replacement media content may be streamed from the media stream service 194 or accessed from the media-playback device 102 memory device 156.

Figure 22:
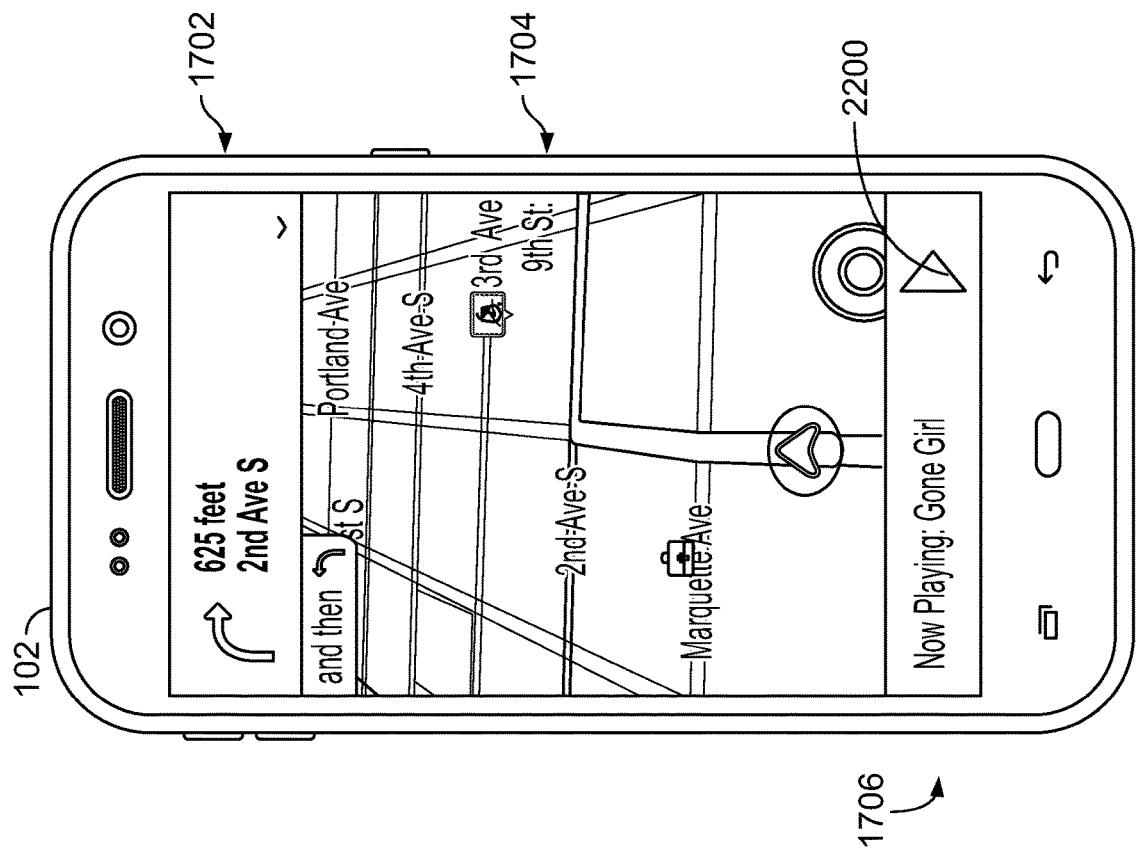
FIG. 22 illustrates another embodiment of a user interface displayed on the media-playback device of FIG. 2.

FIG. 22 illustrates an embodiment of the media-playback device 102 operating the duration-based customized media program engine 108 on a user interface 112 to implement operation 2102 of FIG. 21. Similar to FIG. 17, the user interface 112 displays navigation directions 1702 along with a map 1704 of the segment of the route the user is traveling on. The display also includes what is currently playing 1706, which is the audiobook entitled "Gone Girl". Next to the currently playing 1706 display is a "skip" button 2200, displayed here as a triangle. The user may select this button 2200 to input a command to the device 102 to skip the currently playing content. Upon receiving this command, the duration-based customized media program engine 108 implements the method 2006 described in FIG. 21.

Figure 23:
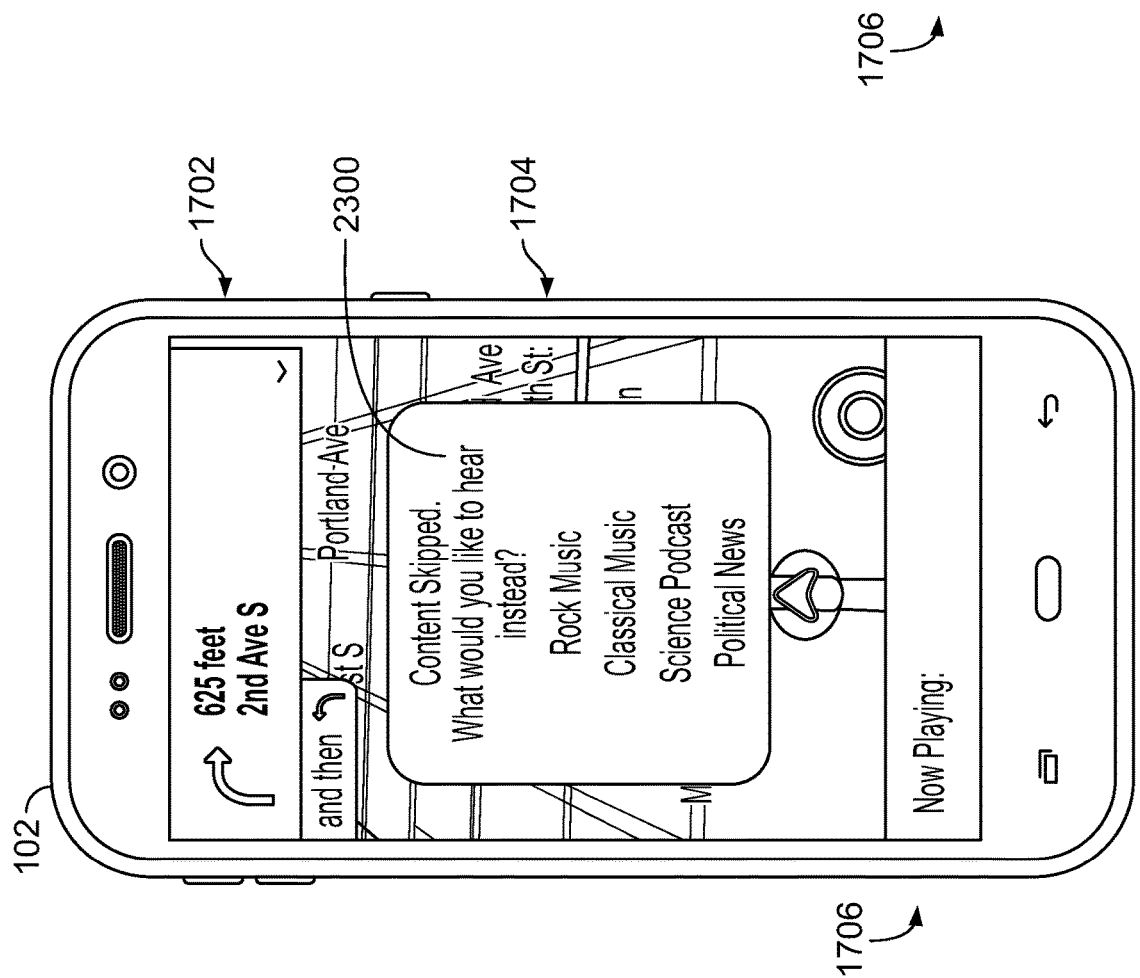
FIG. 23 illustrates another embodiment of a the user interface of FIG. 22 prompting a user for feedback.

FIG. 23 shows the user interface 112 of FIG. 22 after input has been received from the user to skip the currently playing media content. The duration-based customized media program engine 108 has skipped the media content and is now implementing the optional operation 2106 of prompting the user for feedback. In this example, the prompt reads "Content skipped. What would you like to hear instead?" Options are listed for selection including "Rock Music," "Classical Music," "Science Podcast," and "Political News." In other embodiments, the user interface 112 may display and/or announce only one option and request for the user to confirm or reject the suggested option. In yet other embodiments, the user may not be prompted for feedback at all.

Figure 24:
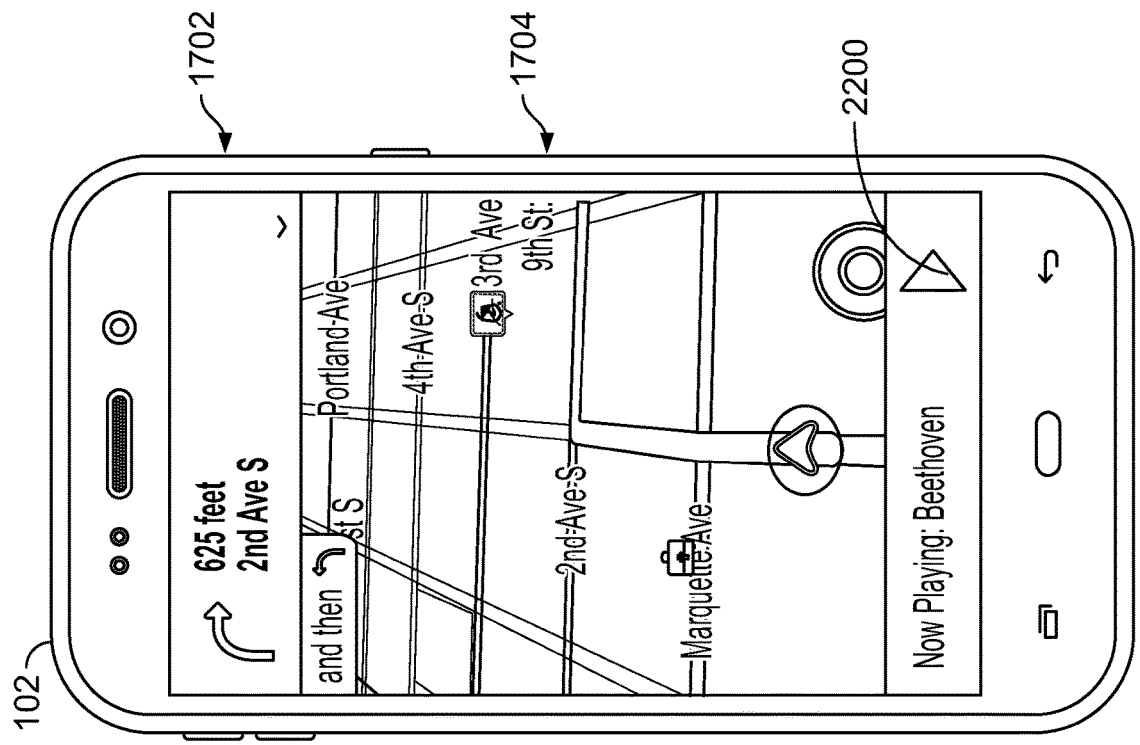
FIG. 24 illustrates another embodiment of the user interface of FIG. 22 after replacement media content has been selected.

FIG. 24 shows the user interface 112 displayed on the media-playback device 102 after operations 2108 and 2110 of method 2006 in FIG. 21 are completed. Replacement media content has been selected and is playing on the media-playback device 102. In this example, the replacement media content is classical music by Beethoven that was selected by input from the user.

Figure 25:
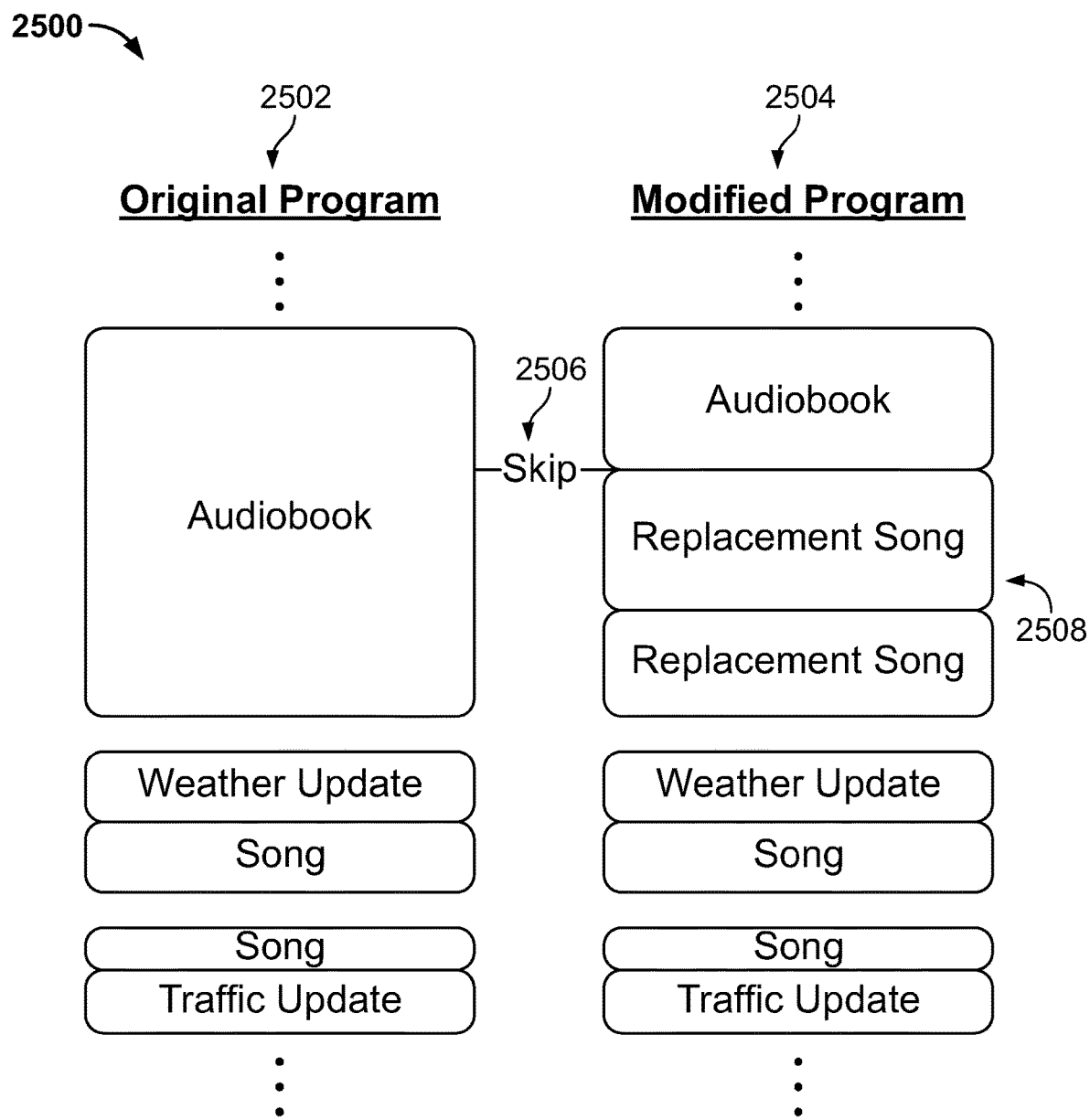
FIG. 25 illustrates an abbreviated schematic diagram of an example media program before and after implementation of the skip and replace operation of FIG. 21.

FIG. 25 illustrates an abbreviated schematic diagram 2500 of an example media program before and after implementing the skip and replace operation 2006 described in FIG. 21. The original program 2502 corresponds to the media program diagram 1800 shown in FIG. 18. The modified program 2504 shows how the media program is modified in response to receiving input from the user to skip currently playing media. In this example, the skip 2506 occurred while an audiobook was playing. Two replacement songs 2508 were selected to replace the remaining audiobook content. Otherwise, the customized media program remains unaltered.

Figure 26:
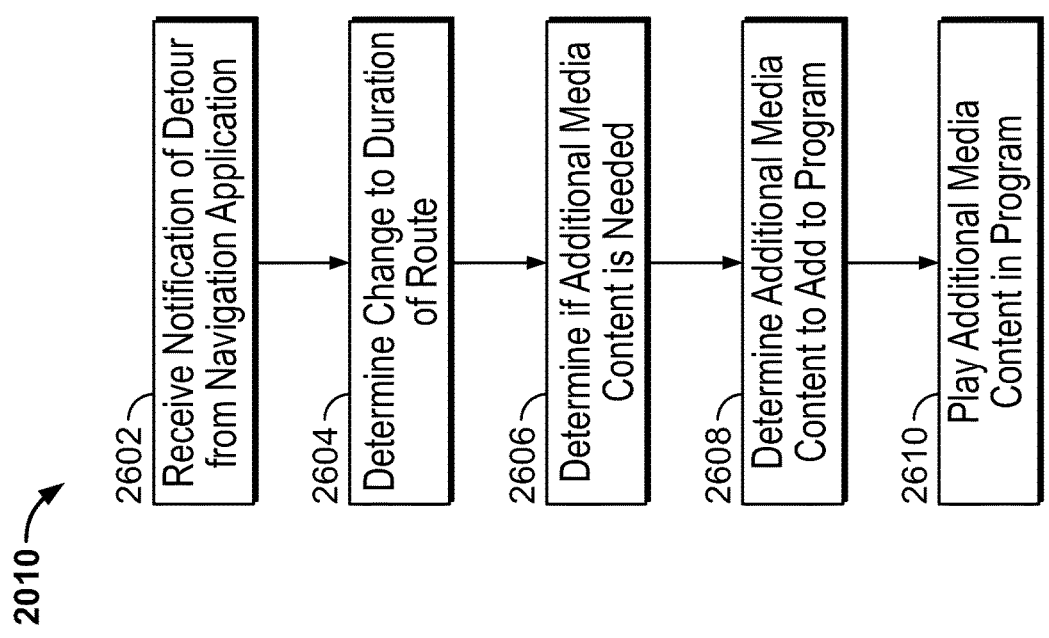
FIG. 26 illustrates an example method of modifying a customized media program in response to a route detour that is performed by some embodiments of the duration-based customized media program engine of FIG. 2.

FIG. 26 illustrates an example of the detour operation 2010 of FIG. 20. This method of modifying a customized media program in response to changes in the duration of a route is performed by some embodiments of the duration-based customized media program engine 108.

At operation 2602, a detour notification is received from the navigation application 171. The detour could be caused by traffic, road construction, or even the user taking a wrong turn.

At operation 2604, the duration engine 304 of the duration-based customized media program engine 108 determines if the detour has affected the duration of the route. Typically, a detour will result in the duration of the route increasing.

At operation 2606, the duration-based customized media program engine 108 determines if additional media content is needed. If the duration has increased, more media content will need to be added to the program to last for the new duration of the route.

At operation 2608, the news engine 306 and entertainment engine 308 of the duration-based customized media program engine 108 select additional media content to include in the customized media program. These selections are based upon the same criteria discussed in FIGS. 13-14.

At operation 2610 the additional media content is played along with the rest of the customized media program.

Figure 27:
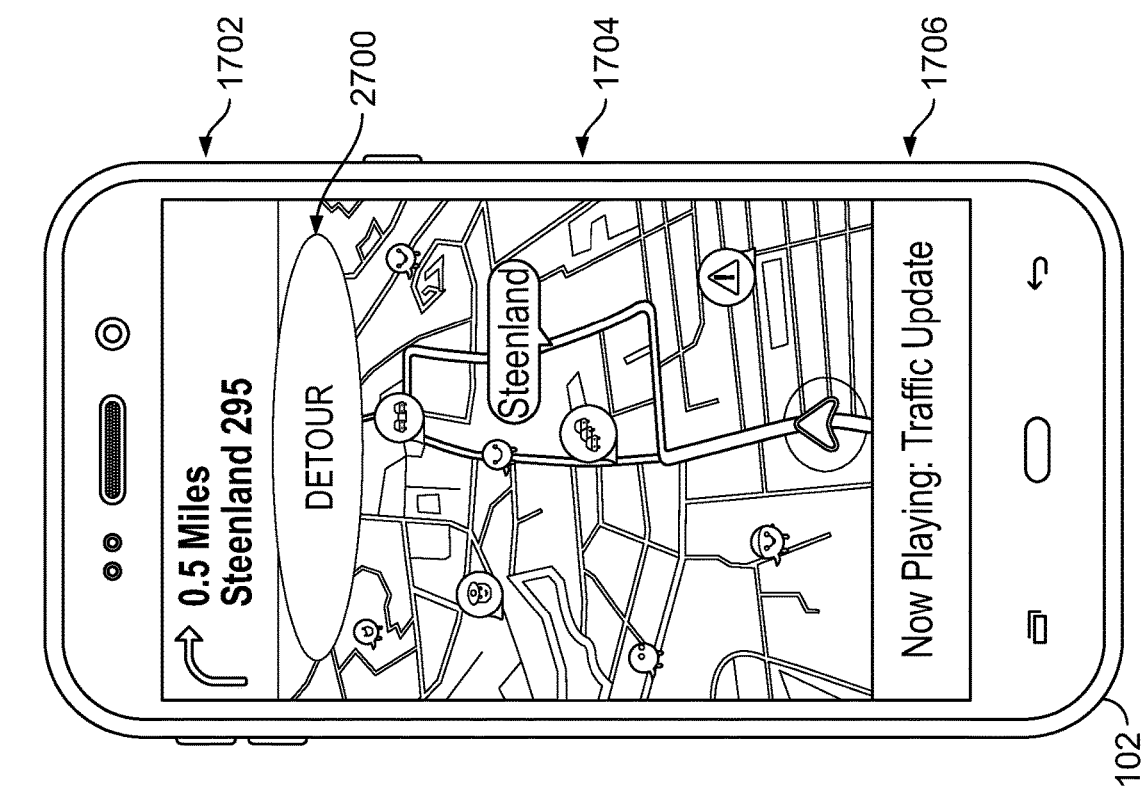
FIG. 27 illustrates another embodiment of a the user interface of FIG. 22 showing a detour notification.

FIG. 27 illustrates the user interface 112 displayed on the media-playback device 102 after a notification of a detour has been received, as described in operation 2602 of FIG. 26. The map display 1704 shows a new route and a detour notification 2700 is displayed on the user interface 112.

Figure 28:
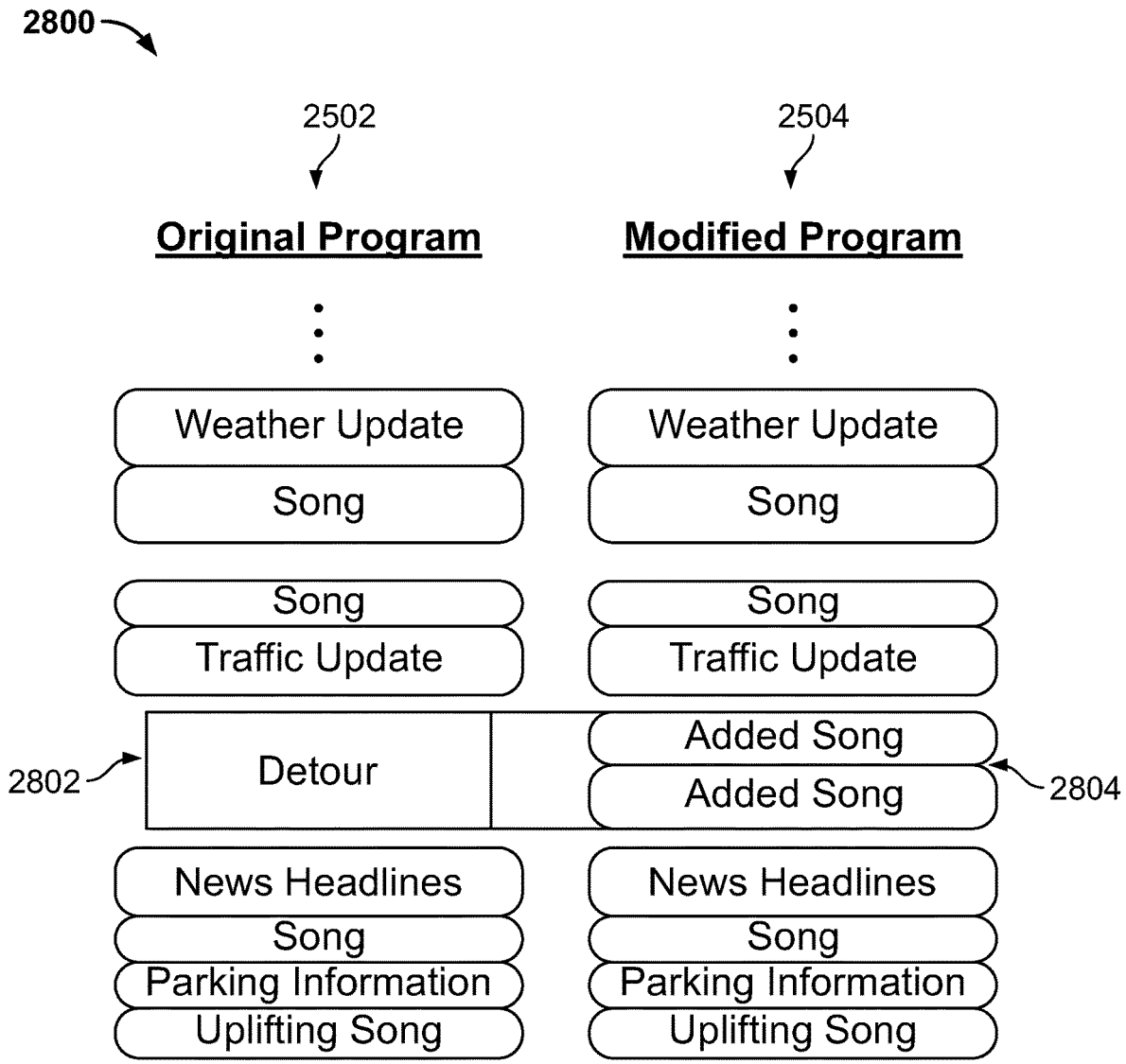
FIG. 28 illustrates an abbreviated schematic diagram of an example media program before and after implementation of the detour operation of FIG. 26.

FIG. 28 illustrates an abbreviated schematic diagram 2800 of an example media program before and after implementing the detour operation 2010. The original program 2502 corresponds to the media program diagram 1800 shown in FIG. 18. The modified program 2504 shows how the media program is modified in response to a detour 2802 that increases the duration of the route. In this example, the detour required the program to be extended. Two added songs 2804 are inserted into the media program, while the rest of the program remains the same.

Figure 29:
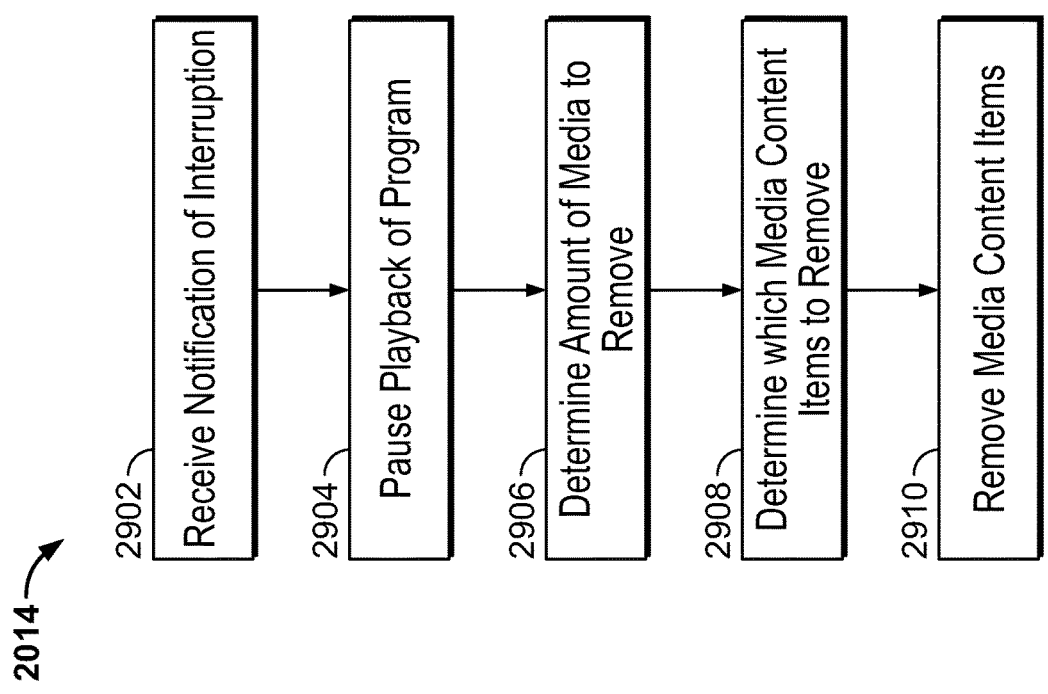
FIG. 29 illustrates an example method of modifying a customized media program in response to a playback interruption that is performed by some embodiments of the duration-based customized media program engine of FIG. 2.

FIG. 29 illustrates an example of the interruption operation 2014 of FIG. 20. This method of modifying a customized media program in response to playback interruption is performed by some embodiments of the duration-based customized media program engine 108.

At operation 2902, a notification of an interruption is received by the duration-based customized media program engine 108. The interruption may be an operation performed on the media-playback device 102 that interrupts playback, such as receiving a phone call. Alternatively, the interruption could be instigated by the user. The user could pause playback of the media program for any number of reasons.

At operation 2904, playback of the customized media program is paused.

At operation 2906, the customized media program engine 108 determines how much media content needs to be removed in response to the interruption. This may be a continuously updating process, or may occur after playback of the program has resumed.

At operation 2908, the customized media program engine 108 determines which media content items to remove from the playlist in response to the interruption. Preferably, the media content items are chosen from the middle of the playlist so that key portions of the media program at the beginning and end of the playlist are not disrupted.

Figure 30:
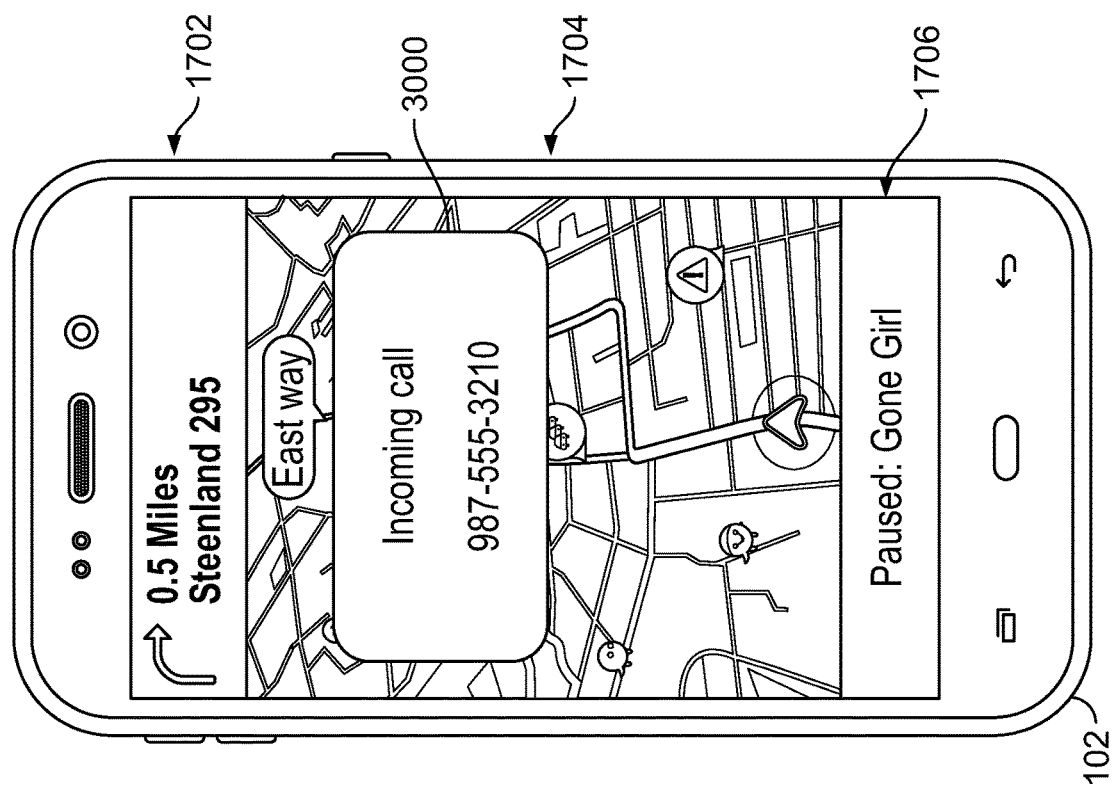
FIG. 30 illustrates another embodiment of a the user interface of FIG. 22 showing an incoming call notification.

FIG. 30 illustrates the user interface 112 displayed on the media-playback device 102 after a notification of an interruption has been received, as described in operations 2902 and 2904 of FIG. 29. A notification 3000 of an incoming call is displayed over the map display 1704 and the now playing display 1706 indicates that the media playback is paused.

Figure 31:
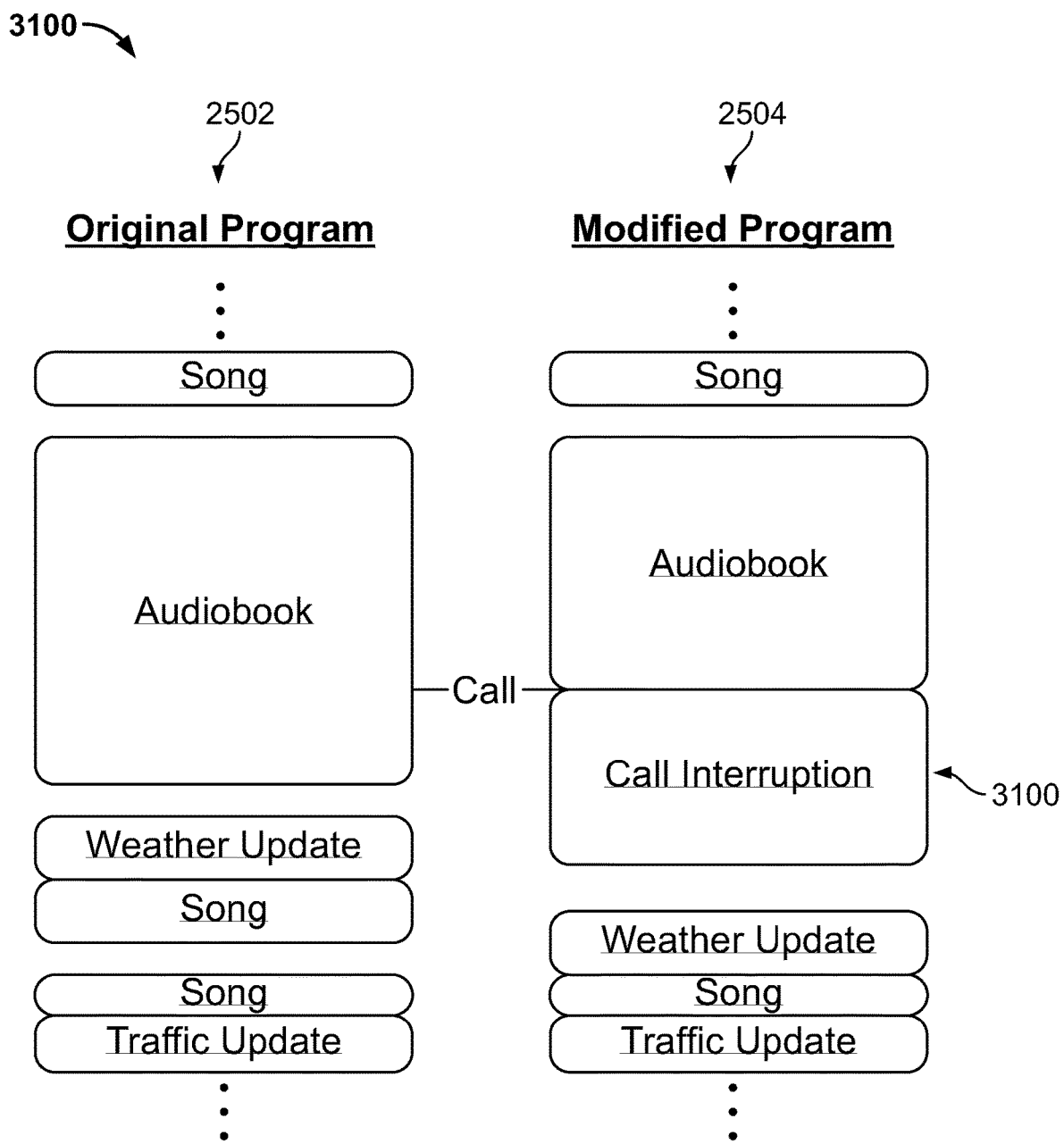
FIG. 31 illustrates an abbreviated schematic diagram of an example media program before and after implementation of the interruption operation of FIG. 29.

FIG. 31 illustrates an abbreviated schematic diagram 3100 of an example media program before and after implementing the interruption operation 2014. The original program 2502 corresponds to the media program diagram 1800 shown in FIG. 18. The modified program 2504 shows how the media program is modified in response to an interruption to playback. In this example, a phone call is received while the user is listening to an audiobook and the customized media program needs to be modified to remove media content to adjust the overall duration in response to the interruption. The call interruption 3100 results in the end of the audiobook portion of the program to be removed. The weather update and traffic update are considered higher priority media items than the songs, so they remain in the playlist. However, one song is also removed from the playlist in addition to the end of the audiobook.

Adjustments to the media program such as those described in FIGS. 20-31 may occur dynamically during playback. Additional media content may be accessed by streaming or by caching extra media content when a customized program is downloaded. Regardless of the circumstances, the customized media program is designed to adjust to match the duration of a given route so that a user has a variety of entertainment and news content to listen to during an entire trip.

As noted previously, although many of the examples provided above are described with respect to traveling in a vehicle, other embodiments relate to other forms of travel or even other types of activities.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computing device comprising:
   a processor; and
   a memory device encoding instructions that, when executed by the processor, cause the computing device to:
   determine a route to a destination;
   determine a duration of the route;
   build a customized playlist having a duration matching the duration of the route, the customized playlist comprising one or more media content items; and
   after building the customized playlist, determine spoken content to accompany the customized playlist.

2. The computing device of claim 1, wherein the instructions further cause the computing device to play the customized playlist and the spoken content through a content output device.

3. The computing device of claim 2, wherein the instructions further cause the computing device to:
   detect a disruption to playback of the customized playlist; and
   in response to the disruption to playback, add or remove one or more media content items from the customized playlist.

4. The computing device of claim 1, wherein the duration of the route is determined based on a mode of travel and travel conditions of the route.

5. The computing device of claim 1, wherein the spoken content is in the form of a radio personality.

6. The computing device of claim 1, wherein the spoken content is prerecorded.

7. The computing device of claim 1, wherein the spoken content is generated with speech synthesis.

8. The computing device of claim 1, wherein the customized playlist comprises multiple segments and wherein the spoken content is provided to introduce each segment.

9. The computing device of claim 8, wherein the spoken content is provided to conclude each segment.

10. A method of generating a customized media program comprising:
    determining a duration of the customized media program;
    building the customized media program including one or more items of media content that fit the determined duration;
    generating the customized media program;
    determining spoken content to accompany the customized media program;
    detecting a disruption the customized media program;
    determining whether more or less media content is needed in the customized media program based on the disruption;
    determining which media content to add or remove from the customized media program; and
    adding or removing the media content from the customized media program.

11. The method of claim 10, further comprising: playing the customized media program and the spoken content through a content output device.

12. The method of claim 11, further comprising: further comprising: determining a duration of a route, the duration of the customized media program being based on the duration of the route.

13. The method of claim 10, wherein the spoken content is prerecorded.

14. The method of claim 10, wherein the spoken content introduces each media content item.

15. The method of claim 10, wherein the spoken content concludes each media content item.

16. One or more non-transitory computer-readable media having computer-executable instructions embodied thereon that, when executed by a computing device, cause the computing device to:
    determine a route to a destination;
    determine a duration of the route;
    build a customized playlist based on the duration of the route, wherein the customized playlist includes one or more content items; and
    after building the customized playlist, determine spoken content to accompany the customized playlist.

17. The non-transitory computer-readable media of claim 16, wherein the computer-executable instructions further cause the computing device to determine driving conditions of the route and the customized playlist is built taking into account the driving conditions of the route.

18. The non-transitory computer-readable media of claim 16, wherein the computer-executable instructions further cause the computing device to play the customized playlist and spoken content through a content output device.

19. The non-transitory computer-readable media of claim 16, wherein the customized playlist comprises multiple segments and wherein the spoken content is provided to introduce each segment.

20. The non-transitory computer-readable media of claim 19, wherein the spoken content concludes each segment.

21. The non-transitory computer-readable media of claim 16, wherein the spoken content is in the form of a radio personality.

22. The non-transitory computer-readable media of claim 16, wherein the spoken content is prerecorded.

23. The non-transitory computer-readable media of claim 16, wherein the spoken content is generated using speech synthesis.

24. The non-transitory computer-readable media of claim 16, wherein the computer-executable instructions further cause the computing device to:
    detect a disruption to the customized playlist;
    determine whether more or less media content is needed in the customized playlist based on the disruption;
    determine which media content to add or remove from the customized playlist; and
    add or remove the media content from the customized playlist.

* * * * *